US007841945B2

(12) United States Patent
Kamikawa et al.

(10) Patent No.: US 7,841,945 B2
(45) Date of Patent: Nov. 30, 2010

(54) WIRELESS COMMUNICATION GAME SYSTEM AND STORAGE MEDIUM STORING A WIRELESS COMMUNICATION GAME PROGRAM

(75) Inventors: Yoji Kamikawa, Kyoto (JP); Masaru Mitsuyoshi, Kyoto (JP)

(73) Assignee: Nintendo Co., Ltd., Kyoto-Shi, Kyoto (JP)

( * ) Notice: Subject to any disclaimer, the term of this patent is extended or adjusted under 35 U.S.C. 154(b) by 974 days.

(21) Appl. No.: 11/037,183

(22) Filed: Jan. 19, 2005

(65) Prior Publication Data

US 2005/0159221 A1 Jul. 21, 2005

(30) Foreign Application Priority Data

Jan. 20, 2004 (JP) ............................... 2004-12296

(51) Int. Cl.
*G06F 17/00* (2006.01)
(52) U.S. Cl. .......................................... 463/42; 463/39
(58) Field of Classification Search ............. 463/40–42, 463/39; 455/7, 11; 370/389; 717/117; 725/147; 709/246, 223
See application file for complete search history.

(56) References Cited

U.S. PATENT DOCUMENTS

| 5,618,045 | A | * | 4/1997 | Kagan et al. ................... 463/40 |
| 5,738,583 | A | * | 4/1998 | Comas et al. .................. 463/40 |
| 6,324,603 | B1 | * | 11/2001 | Niizuma et al. ............... 710/72 |
| 7,275,994 | B2 | * | 10/2007 | Eck et al. ........................ 463/45 |
| 7,313,766 | B2 | * | 12/2007 | Kautto Kiovula et al. ... 715/853 |
| 7,472,418 | B1 | * | 12/2008 | McCorkendale et al. ...... 726/24 |
| 2002/0122410 | A1 | * | 9/2002 | Kulikov et al. ............... 370/349 |
| 2004/0110563 | A1 | * | 6/2004 | Tanaka et al. .................. 463/39 |
| 2005/0221897 | A1 | * | 10/2005 | Oe ................................. 463/42 |
| 2007/0093294 | A1 | * | 4/2007 | Serafat et al. .................. 463/39 |

FOREIGN PATENT DOCUMENTS

| JP | 10151274 | * | 6/1998 |
| JP | 2000-135380 | | 5/2000 |
| JP | 2000135380 | * | 5/2000 |
| JP | 2001-087561 | | 4/2001 |
| JP | 2001-156782 | | 6/2001 |
| JP | 2002-224449 | | 8/2002 |

(Continued)

OTHER PUBLICATIONS

Office Action dated Jan. 27, 2009 issued in corresponding JP Application No. 2004-012296.

*Primary Examiner*—Peter DungBa Vo
*Assistant Examiner*—Masud Ahmed
(74) *Attorney, Agent, or Firm*—Nixon & Vanderhye P.C.

(57) ABSTRACT

A wireless communication game system includes at least one parent device and a plurality of child devices that can communicate wirelessly with one another. The parent device transmits a parent device program and game data for distribution and generation information indicating what generation the data for distribution belongs to when counting from the one in the parent device. Each of the child devices receives the data for distribution and executes the parent device program to update the generation information and transmit to another plurality of child devices the parent device program and game data for distribution and the updated generation information.

23 Claims, 14 Drawing Sheets

| | FOREIGN PATENT DOCUMENTS | | WO | 9323125 | * 11/1993 |
|---|---|---|---|---|---|
| JP | 2003-051771 | 2/2003 | | | |
| JP | 2003-169965 | 6/2003 | * cited by examiner | | |

(A)

(B)

PARENT DEVICE PACKET

CHILD DEVICE PACKET

FIG. 17

```
SELECT PARENT DEVICE TO BE CONNECTED AND PRESS A BUTTON.

**** PARENT DEVICE LIST ****

<UserName>   <GENERATION INFORMATION>   <GameName>
    ▶ 1.    TAROH                  2                  F-ZERO
      2.    ICHIROH                1                  F-ZERO
      3.    JIROH                  3                  F-ZERO
```

WIRELESS COMMUNICATION GAME SYSTEM AND STORAGE MEDIUM STORING A WIRELESS COMMUNICATION GAME PROGRAM

This application claims priority to Japanese Application No. 2004-12296 filed 20 Jan. 2004, the entire contents of each of which are hereby incorporated by reference.

FIELD OF THE INVENTION

The illustrative embodiments relate to a wireless communication game system and a storage medium storing a wireless communication game program. More specifically, the illustrative embodiments relate to a wireless communication game system and a storage medium storing a wireless communication game program used for the game system, including at least one parent device and a plurality of child devices that can communicate wirelessly with one another.

BACKGROUND AND SUMMARY OF THE INVENTION

One example of a conventional wireless communication game system is disclosed in patent document 1 (Japanese Patent Application Laying-open No. 2000-135380). In this patent document 1, a prescribed number (e.g. four) of game apparatuses are configured in such a manner that, taking a period of time during which transmission/reception of communication data makes a round among the game apparatuses, this cycle is divided into four and allocated to each game apparatus, and each game apparatus transmits communication data in order for each allocated period of time.

According to this patent document 1, since there is a limit placed on the number of game apparatuses capable of performing wireless communications, it is difficult to transmit communication data to more game apparatuses in a short period of time. With wireless communications, there is generally a limit to the number of child devices with which a parent device can communicate simultaneously. If an attempt is made to increase the number of child devices with which a parent device can communicate simultaneously, problems, such as a decrease in an amount of data transmittable at one communication step and a decline in a degree of communication accuracy, may occur.

One aspect of the illustrative embodiments provides a novel wireless communication game system and a storage medium storing a wireless communication game program.

Another aspect of the illustrative embodiments provides a wireless communication game system and a storage medium storing a wireless communication game program that can transmit data from a parent device to more child devices in a short period of time.

A further aspect of the illustrative embodiments provides a wireless communication game system and a storage medium storing a wireless communication game program that, in transmitting data in order from a parent device to child devices and from the child devices to other child devices, using wireless communications, makes it possible to transmit information indicating what generation the data belongs to in relation to the original data stored in the parent device.

A wireless communication game system according to the illustrative embodiments includes at least one parent device and a plurality of child devices that can communicate wirelessly with one another. The parent device comprises a first data storage means for storing at least a parent device program and game data, a first communication means for communicating wirelessly with a plurality of child devices, and a first connection means for searching for a plurality of communicable child devices and establishing connection with each of the child devices by broadcasting data for connection, using the first communication means. Each of the child devices comprises a second communication means for communicating wirelessly with the parent device and a second connection means for searching for the communicable parent device and establishing connection with the parent device by receiving the data for connection, using the second communication means. The parent device further comprises a transmission means for transmitting, using the first communication means, the parent device program and the game data stored in the first data storage means to each of the child devices with which connection is established by the first connection means and the second connection means. Each of the child devices further comprises a reception means for receiving, using the second communication means, the parent device program and the game data from the parent device with which connection is established by the first connection means and the second connection means, a second data storage means for storing the parent device program and the game data received by the reception means in a writable and readable manner, and a parent device processing means for executing the parent device program stored in the second data storage means. The parent device processing means executes the parent device program to search for another plurality of communicable child devices and establish connection with each of the child devices by broadcasting the data for connection, using the second communication means, and transmits, using the second communication means, the parent device program and the game data stored in the second data storage means to each of the child devices with which connection is established.

More specifically, the wireless communication game system includes at least one parent device and a plurality of child devices that can communicate wirelessly with one another. In an embodiment described later, a handheld game apparatus (10) (reference numeral corresponding to one in the preferred embodiments. The same is applied to following numerals.) is employed, for example. A first data storage means (42) provided to the parent device stores at least a parent device program (68) and game data (76). In addition, a first communication means (14) is intended for wireless communications with a plurality of child devices. A first connection means (22, 66, S3 to S11) searches for a plurality of communicable child devices and establishes connection with each of the child devices by broadcasting data for connection using the first communication means. Meanwhile, a second communication means (14) provided to each child device is intended for wireless communications with the parent device. A second communication means (22, S101 to S115) searches for a communicable parent device and establishes connection with the parent device by receiving the data for connection using the second communication means. Moreover, a transmission means (22, 66, S21) of the parent device transmits, using the first communication means, the parent device program and the game data stored in the first data storage means to each of the child devices with which connection is established by the first connection means and the second connection means. Then, a reception means (22, S121) of each of the child devices receives, using the second communication means, the parent device program and the game data from the parent device with which connection is established by the first connection means and the second connection means. A second data storage means (22, 28, 86, S123) stores the parent device program and the game data received by the reception means in a writable and readable manner. A parent device processing means (22, S125) executes the parent device program stored in the second data storage means. Also, the parent device processing means executes the parent device program to search for another plurality of communicable child devices and establish connection with each of the child devices by broadcasting the data for connection, using the second communication means (S139 to S147), and transmits the parent device program and the game data stored in the second data storage means to each of the child devices with which connection is established (S157). In this manner, child devices receiving the parent device program and the game data from the parent device can then transmit the data to other child devices in sequence as tentative parent devices by executing the parent device program. Consequently, it is possible to transmit data to more child devices in a short period of time.

In one illustrative embodiment, the first data storage means (64) stores generation information indicating what generation the parent device program and the game data belong to in relation to the original data stored in the parent device. The transmission means transmits the generation information in addition to the parent device program and the game data. The reception means receives the generation information in addition to the parent device program and the game data. The second data storage means (88) stores the generation information received by the reception means. The parent device processing means updates the generation information stored in the second data storage means (S135), and transmits to each of the child devices the updated generation information in addition to the parent device program and the game data. Accordingly, the generation information transmitted together with the parent device program and the game data is updated in a child device, and the updated generation information is transmitted at time of data transmission to another child device, which allows the child devices to recognize what generation the received data belongs to in relation to the original data stored in the parent device.

In another illustrative embodiment, each of the child devices further comprises a second game processing means (20, 72, S163) for processing the game data stored in the second data storage means according to instructions from a player. The second game processing means determines whether or not the updated generation information has a first value (S173, S183) and changes a game process depending on whether or not it is determined that the generation information has the first value. Thus the child device changes the game process based on a result of determination on the updated generation information, that is, the child device produces variations in details of the game according to the value of the generation information. This makes it possible to realize a more surprising, interesting game system.

In another illustrative embodiment, the parent device processing means determines whether or not the updated generation information has a second value (S137) and, when determining that the generation information has the second value, deactivates a process of transmitting the parent device program and the game data. Therefore, when the updated generation information has reached a prescribed second value in a child device, the child device no longer performs data transmission after that. This makes it possible to avoid unlimited data transmission.

In still another illustrative embodiment, the parent device processing means transmits successful reception data to the parent device, in response to reception of the parent device program and the game data by the reception means (S131). The parent device further comprises a number-of-successful-transmissions storage means and a display means. The number-of-successful-transmissions storage means (22, 28, 44, S59 to S61) of the parent device stores the number of successful transmissions in an updatable manner, based on the successful reception data received from each child device via the first communication means. Also, the display means (18, 20, 51, S63) displays the number of successful transmissions stored in the number-of-successful-transmissions storage means. In this way, since the number of successful transmissions is updated based on the successful reception data transmitted from the child device and is displayed, the parent device can notify the player of the number of child devices to which data transmission has succeeded. As a consequence, this can raise the player's motivation for performing wireless communications. Additionally, it is possible to suggest such a game as making players having parent devices vie with each other in the number of successful transmissions.

In another aspect, the parent device further comprises a determination means and a first game processing means. The determination means (22, S73, S83) of the parent device determines whether or not the number of successful transmissions stored in the number-of-successful-transmissions storage means is a third value. The first game processing means (20, 70, S29) processes the game data stored in the first data storage means according to instructions from the player. Also, the first game processing means changes a game process depending on whether or not the determination means determines that the number of successful transmissions is the third value. Accordingly, the parent device changes the game process based on a determination result, that is, the parent device produces variations in details of the game according to the number of successful transmissions. This makes it possible to realize a more surprising, interesting game system.

A wireless communication game system according to the illustrative embodiments is a wireless communication game system including at least one parent device and a plurality of child devices that can communicate wirelessly with one another. The parent device comprises a first data storage means for storing at least a parent device program, game data, and generation information indicating what generation the parent device program and the game data belong to, in relation to the original data stored in the parent device, a first communication means for communicating wirelessly with a plurality of child devices, and a transmission means for transmitting the parent device program, the game data, and the generation information stored in the first data storage means, to each of the child devices, using the first communication means. Each of the child devices comprises a second communication means for communicating wirelessly with the parent device, a reception means for receiving the parent program, the game data, and the generation information from the parent device, using the second communication means, a second data storage means for storing the parent device program, the game data, and the generation information received by the reception means, in a writable and readable manner, and a parent device processing means for executing the parent device program stored in the second data storage means. The parent device processing means executes the parent device program to update the generation information stored in the second data storage means and transmit the parent device program, the game data and the updated generation means stored in the second data storage means, to another plurality of child devices, using the second communication means.

More specifically, the wireless communication game system includes at least one parent device and a plurality of child devices that can communicate wirelessly with one another. In an illustrative embodiment described later, a handheld game apparatus (10) is employed, for example. A first data storage means (42) provided to the parent device stores at least a parent device program (68), game data (76) and generation information (64) indicating what generation the parent device program and the game data belong to in relation to the original data stored in the parent device. A first communication means (14) is intended for wireless communications with a plurality of child devices. Also, a transmission means (22, 66, S21) transmits the parent device program, the game data and the generation information stored in the first data storage means, to each child device, using the first communication means. Meanwhile, a second communication means (14) provided to the child device is intended for wireless communications with the parent device. A reception means (22, S121) receives the parent device program, the game data and the generation information from the parent device with the use of the second communication means. A second data storage means (22, 28, 86, S123) stores the parent device program, the game data and the generation information received by the reception means, in a writable and readable manner. A parent device processing means (22, S125) executes the parent device program stored in the second data storage means. Additionally, the parent device processing means executes the parent device program to update the generation information stored in the second data storage means (S135) and transmit the parent device program, the game data and the updated generation information stored in the second data storage means, to another plurality of child devices, using the second communication means (S157). In this manner, the parent device transmits, to child devices, the parent device program, the game data and the generation information indicating what generation the data belongs to in relation to the original data stored in the parent device. Then the child devices receiving this information update the generation information and transmit the data and the generation information to other child devices, acting as tentative parent devices, in response to the execution of the parent device program. Accordingly, it is possible to send data to more child devices in a short period of time and allow the child devices receiving the data to recognize what generation the data belongs to.

A storage medium storing a wireless communication game program according to an illustrative embodiment is a storage medium storing a wireless communication game program for a wireless communication game system including at least one parent device and a plurality of child devices that can communicate wirelessly with one another. The parent device comprises a first data storage means for storing at least a parent device program and game data, and a first communication means for communicating wirelessly with a plurality of child devices. Each of the child devices comprises a second communication means for wirelessly communicating with the parent device and a second data storage means for storing, in a writable and readable manner, the data received using the second communication means. The wireless communication game program causes a processor of the parent device to execute a first connection step of searching for a plurality of communicable child devices and establishing connection with each of the child devices by broadcasting data for connection using the first communication means. The wireless communication game program causes a processor of the child device to execute a second connection step of searching for the communicable parent device and establishing connection with the parent device by receiving the data for connection with the use of the second communication means. The wireless communication game program causes the processor of the parent device to execute a transmission step of transmitting the parent device program and the game data stored in the first data storage means to each of the child devices with which connection is established by the first connection step and the second connection step. The wireless communication game program causes the processor of the child device to execute a reception step of receiving the parent device program and the game data from the parent device with which connection is established by the first connection step and the second connection step and storing them in the second data storage means, and a parent device processing step of executing the parent device program stored in the second data storage means. In the parent device processing step, the parent device program is executed to search for another plurality of communicable child devices and establish connection with each of the child devices by broadcasting the data for connection with the use of the second communication means, and transmit the parent device program and the game data stored in the second data storage means to each of the child devices with which connection is established.

In the storage medium storing the wireless communication game program as well as the above described wireless communication game system, child devices receiving data from the parent device transmit the data to other child devices in sequence as next parent devices, which allows data transmission to more child devices in a short period of time.

A storage medium storing a wireless communication game program according to an illustrative embodiment is a storage medium storing a wireless communication game program for a wireless communication game system including at least one parent device and a plurality of child devices that can communicate wirelessly with one another. The parent device comprises a first data storage means for storing at least a parent device program, game data, and generation information indicating what generation the parent device program and the game data belong to when counting from the ones in the parent device, and a first communication means for communicating wirelessly with a plurality of child devices. Each of the child devices comprises a second communication means for communicating wirelessly with the parent device and a second data storage means for storing the data received with use of the second communication means in a writable and readable manner. The wireless communication game program causes a processor of the parent device to execute a transmission step of transmitting the parent device program, the game data and the generation information stored in the first data storage means to each child device, using the first communication means. The wireless communication game program causes a processor of the child device to execute a reception step of receiving the parent device program, the game data and the generation information from the parent device, using the second communication means and storing them in the second data storage means, and a parent device processing step of executing the parent device program stored in the second data storage means. The parent device processing step executes the parent device program to update the generation information stored in the second data storage means and transmit the parent device program, the game data and the updated generation information stored in the second data storage means to another plurality of child devices, using the second communication means. In the storage medium storing the wireless communication game program as well as the above described wireless communication game system, it is possible to transmit data to more child devices in a short period of time and allow the child devices receiving the data to recognize what generation the data belongs to.

According to an illustrative embodiment, child devices receiving data from the parent device transmit the data to other child devices in sequence, as tentative parent devices, which allows data transmission to more child devices in a short period of time.

Moreover, in transmitting data in sequence from the parent device to child devices and from the child devices to other child devices, in a case where the data includes the generation information, each of the child devices can recognize what generation the received data belongs to in relation to the original data stored in the parent device.

The above described other features and aspects of the illustrative embodiments will become more apparent from the following detailed description when taken in conjunction with the accompanying drawings.

BRIEF DESCRIPTION OF THE DRAWINGS

FIG. 17 is a flowchart showing one example of a parent device list displayed in the child device.

DETAILED DESCRIPTION OF THE PREFERRED EMBODIMENTS

Figure 1:
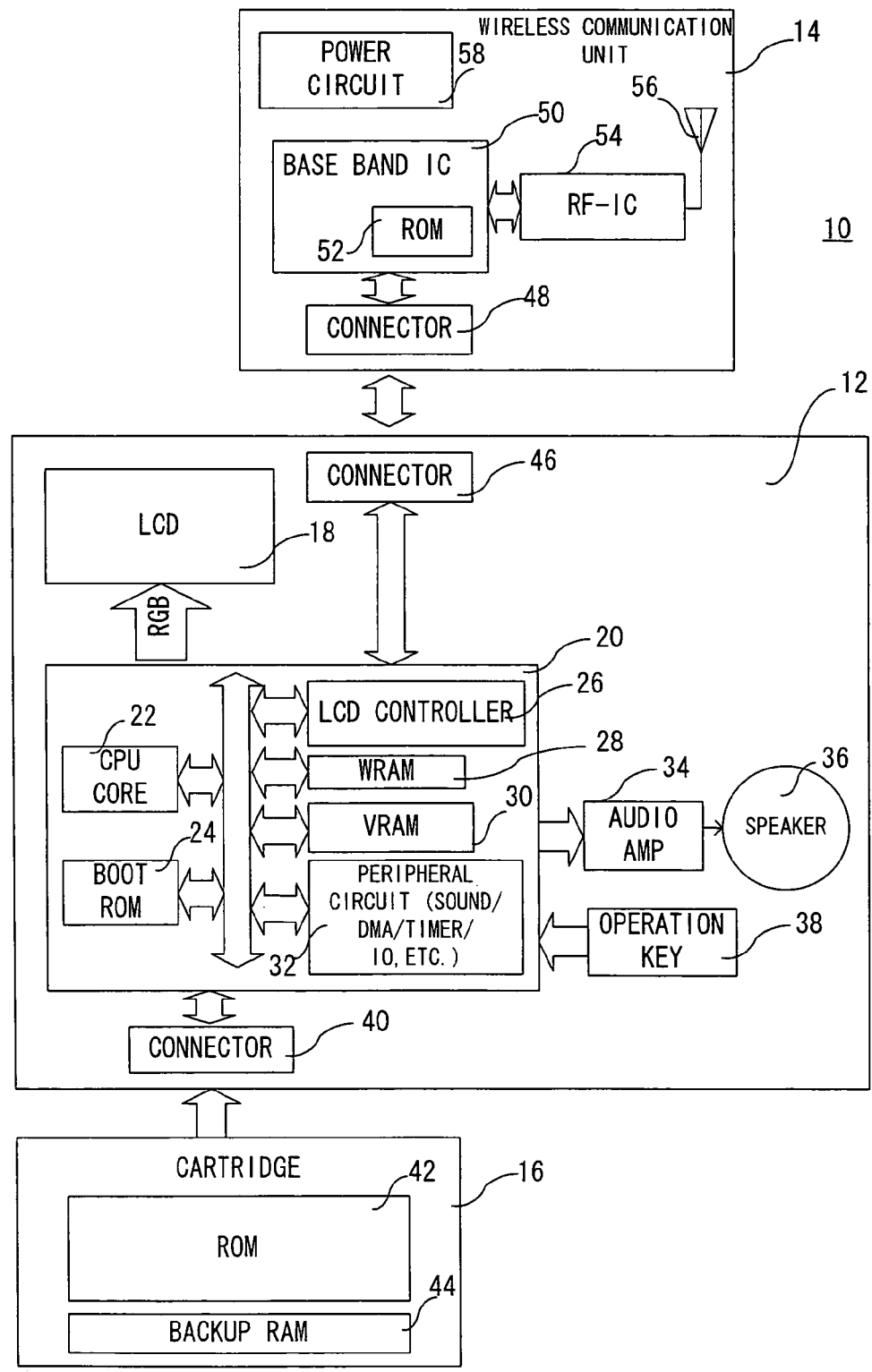
FIG. 1 is a block diagram showing one example of a handheld game apparatus used for a wireless communication game system of one embodiment of the present invention.

In one illustrative embodiment a wireless communication game system employs a handheld game apparatus 10 as shown in FIG. 1, as an example. It is noted that the game apparatus is not limited to a handheld type and may be a console type.

In this embodiment, the handheld game apparatus 10 includes a handheld game machine 12 such as GameBoy Advance (GAMEBOY ADVANCE: product name), a wireless communication unit 14 connected to a communication connector 46 of the handheld game machine 12, and a cartridge 16 connected to a cartridge connector 40.

The handheld game machine 12 shown in FIG. 1 includes a processor 20, and the processor 20 includes a CPU core 22 and a boot ROM 24 related thereto, an LCD controller 26, a WRAM (working RAM: the same is applied hereinafter) 28, a VRAM 30, and a peripheral circuit 32. Additionally, the peripheral circuit 32 includes a voice (sound) circuit, a DMA (Direct Memory Access) circuit, a timer circuit, an input/output interface (I/O), etc. An LCD 18 provided on a front surface of the handheld game machine 12 is provided with a display signal or an RGB signal in this embodiment from the processor 20, and thus a game image is displayed in color on the LCD 18. In addition, a sound circuit (audio amplifier) 34 is provided with an audio signal from the processor 20, and such sounds as game music and sound effects are output by the audio signal from a speaker 36. Furthermore, a cross key, a start key, a select key, an A button and a B button provided in such a manner as to sandwich the LCD 18 on the front surface of the handheld game machine 12, are shown in the lump as an operation switch 38. An operation signal from the operation switch or the operation key 38 is input into the processor 20. Therefore, the processor 20 executes a process according to instructions given by a user or a player through the operation switch 38.

The handheld game machine 12 has the cartridge connector 40, and the cartridge 16 is connected with or inserted into this cartridge connector 40. The cartridge 16 contains a ROM 42 and a backup RAM 44. The ROM 42 stores, in advance, a game program and data for a game to be executed in the handheld game machine 12, together with a game name, a user name, etc. The backup RAM 44 is intended to store (save) data for a game still in progress and data for a result of the game.

Additionally, described in this embodiment is an operation in an OC mode (one-cartridge mode: a mode in which only the parent device has the game cartridge attached, and the child device operates upon downloading of a program and data for distribution from the parent device cartridge 16). Thus the cartridge 16 is attached to the parent device only, whereas the cartridge 16 does not need to be attached to the child device.

When the handheld game machine 12 is powered on, the CPU core 22 executes a boot program stored in the boot ROM 24 to perform a starting process for the handheld game machine 12. After that, the CPU core 22 executes a game program stored in the ROM 42 of the cartridge 16 and performs a game process while storing temporary data in execution in the writable and readable WRAM 28. Additionally, image data generated by the CPU core 22 to execute the game program is stored in the VRAM 30. The image data stored in the VRAM 30 is output to the LCD 18 by the LCD controller 26.

The handheld game machine 12 is further provided with the communication connector 46. The communication connector 46 is engaged with the connector 48 of the wireless communication unit 14.

The wireless communication unit 14 is a communication means for communicating with another handheld game apparatus 10 in a short-distance wireless manner, for example, which includes a base band IC 50. The base band IC 50 includes a ROM 52. The ROM 52 fixedly stores such programs as a child device program for communications between the parent device and the child devices described later, and such data as a game name, a user name, etc. The base band IC 50 operates based on the programs, etc. in the ROM 52.

The base band IC 50 sends out data (programs, game data, etc.) forwarded from the game machine 12 via the communication connector 46 and the connector 48, and data including a user name, etc. in the ROM 52 or the ROM 42 to an RF (Radio Frequency)-IC 54. The RF-IC 54 modulates the data and transmits a radio wave from an antenna 56. However, an intensity of the radio wave is extremely weak, and is set to so small a value that a user can use it without a license under a regulation of Radio Law. In addition, this wireless communication unit 14 is provided with a power circuit 58. Typically, the power circuit 58 is a battery, and supplies a direct-current power source to each component of the wireless communication unit 14.

The wireless communication unit 14 also receives the radio wave transmitted from another handheld game apparatus 10 by the antenna 56, demodulates it by the RF-IC 54, and inputs a demodulated signal into the base band IC 50. Therefore, the base band IC 50 decodes the demodulated signal to reconstruct the data, and forwards the data to the handheld game machine 12, that is, the WRAM 28, via the connector 48 and the communication connector 46.

Figure 2:
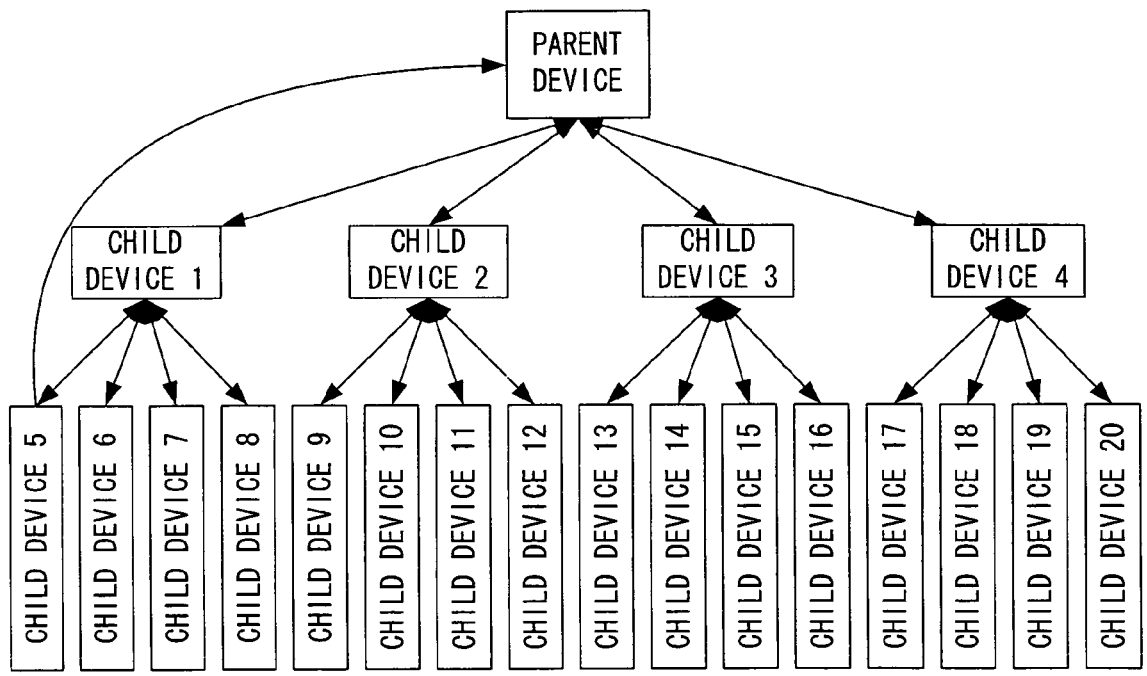
FIG. 2 is a schematic view of a game system using a handheld game apparatus of the FIG. 1 embodiment, FIG. 2 (A) shows a communication relationship between a parent device and a plurality of child devices, and FIG. 2 (B) shows generation information for each device.
Figure 2:
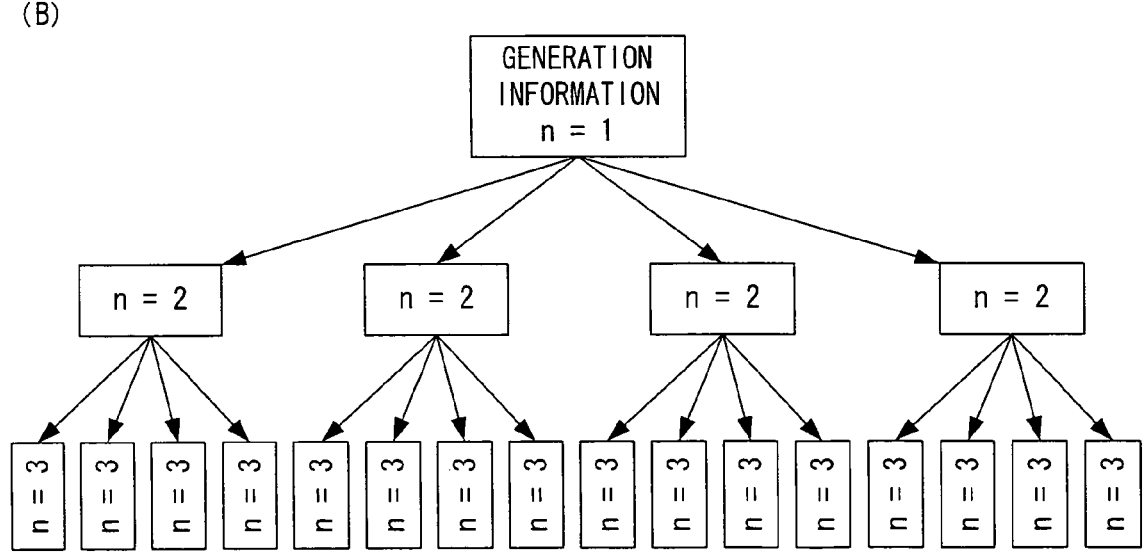

The wireless communication game system of one illustrative embodiment employs a plurality of handheld game apparatuses 10 as shown in FIG. 1. As shown in FIG. 2 (A), this game system includes at least one parent device and a plurality of child devices. The parent device and the plurality of child devices are enabled to communicate wirelessly with one another by their individual wireless communication units 14. Each handheld game apparatus 10 has a prescribed distance of communicable range. The communicable range is a range in which data communications between the parent device and the child devices is allowed by the above-described weak radio wave. Each handheld game apparatus 10 can transmit or receive data to/from another handheld game apparatus 10 existing within the communicable range.

In this game system, data is distributed from the parent device to the plurality of child devices. As an example, conceivable is such a situation in which, at an event venue or the like, an event organizer having a parent device distributes data to a plurality of assembled users with handheld game apparatuses 10.

More specifically, the parent device operates in accordance with a parent device program for self-processing 66 described later or the like stored in the ROM 42 of the cartridge 16, searches for a plurality of child devices existing within the communicable range and establishes connection with each of the child devices, and transmits data for distribution (game program and game data) to the plurality of child devices with which connection is established. The child devices receiving the data for distribution from the parent device stores the received data in the WRAM 28. In FIG. 2 (A), child devices 1 to 4 receive the distributed data through communications with the parent device.

After that, each of the child devices operates in accordance with a parent device program for distribution 68 described later or the like stored in the WRAM 28, searches for another plurality of child devices existing within the communicable range as a temporary (tentative) parent device, and transmits the program and data for distribution stored in the WRAM 28 to the other plurality of child devices. Additionally, in FIG. 2 (A), the child device 1 distributes the data to child devices 5 to 8, the child device 2 to child devices 9 to 12, the child device 3 to child devices 13 to 16, and the child device 4 to child devices 17 to 20, through their individual communications, respectively.

Moreover, each of the child devices (the child devices 5 to 20 in the FIG. 2 (A) example) can transmit data to still another plurality of child devices in accordance with the parent device program for distribution 68, or the like, stored in the WRAM 28, in the same way. Furthermore, the parent device can newly search for a plurality of child devices and distribute data to them again. The child device can also newly search for a plurality of child devices and distribute data to them again.

In this manner, in the game system, at least one parent device transmits data for distribution to a plurality of child devices, and then each of the child devices receiving the data transmits the data for distribution to another plurality of child devices as a tentative parent device. This makes it possible to transmit the data to a plurality of handheld game apparatus 10 in sequence. Therefore, according to this embodiment, it is possible to distribute data to a greater number of game apparatuses 10 in a short period of time.

Additionally, in this embodiment, generation information n is set to indicate what generation the transmitted program and data belong to in relation to the original data stored in the parent device. As shown in FIG. 2 (B), the generation information n for the parent device is set to 1. The parent device transmits the generation information (n=1) to the child devices, in addition to the above mentioned program and data for distribution. The child devices 1 to 4, to which the data is transmitted from the parent device (n=1), receive and store the generation information n in the WRAM 28, and increment the generation information n to update the value to 2. After that, as stated above, each of the child devices transmits the updated generation information (n=2), to another plurality of child devices, in addition to the program and data for distribution, acting as a tentative parent device. The other plurality of child devices 5 to 20 receiving the data from the child device (n=2) update the generation information to set the value to 3, in the same way. In this manner, the generation information is transmitted together with the data for distribution in this game system, and thus each child device can recognize what generation the received data belongs to when counting from the one in the parent device.

Based on the generation information, the child device can produce variations in details of the game, for example, which allow the game to be more surprising and interesting. For example, it is possible to change kinds of characters, stages, etc. for the game by making a game process different depending on whether or not the generation information satisfies a prescribed condition. As the prescribed condition, a magnitude relationship is evaluated between the value of the generation information and a prescribed value (first value), for example. That is, it is determined whether or not the value of the generation information is equal to the prescribed value, or whether the value of the generation information is larger or smaller than the prescribed value.

In addition, it is possible to restrict data distribution based on the generation information. More specifically, when the generation information has reached a prescribed value (second value), the child device can deactivate a data transmission process after that to prevent data from being continuously transmitted without limitation.

Moreover, in this embodiment, the number of successful transmissions m is set to show the number of child devices to which the transmission of data for distribution has succeeded. Thus, the number of successful transmissions m makes it possible to recognize how many child devices to which the data has been successfully distributed from the parent device (n=1). More specifically, in response to the reception of the program and data from the parent device or a tentative parent device, each of the child devices transmits successful reception data to the parent device (n=1) that is a source of transmission of the data for distribution. Upon reception of the successful reception data, the parent device (n=1) updates the number of successful transmissions m based on the successful reception data, and stores the updated number of successful transmissions m. However, it is necessary that the child device transmitting the successful reception data and the parent device (n=1) exist within each other's communicable range. Also, an arrow linking the child device 5 and the parent device, shown as an example in FIG. 2 (A), indicates the transmission of the successful reception data.

The parent device displays the number of successful transmissions m on the display means LCD 18, for example. In this case, it is possible to let the player of the parent device know the number of child devices to which data transmission has succeeded. This further motivates the user having the parent device with the cartridge 16 attached, to perform wireless communications. Additionally, it is possible to suggest such a game in which players having the parent devices compete in the number of successful transmissions.

Moreover, based on the number of successful transmissions m, the parent device can produce variations in the details of the game, for example, which makes the game more surprising and enjoyable. For example, it is possible to change the kinds of characters, stages, etc. by making a game process different depending on whether or not the number of successful transmissions satisfies a prescribed condition. As the prescribed condition, a magnitude relationship is evaluated between the number of the successful transmissions and a prescribed value (third value), for example. That is, it is determined whether or not the value of the generation information is equal to the prescribed value, or whether the value of the generation information is larger or smaller than the prescribed value.

Figure 3:
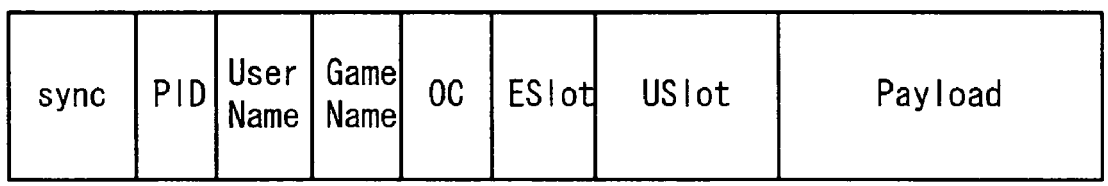
FIG. 3 is an illustrated view showing one example of a parent device packet transmitted from the parent device.
Figure 4:
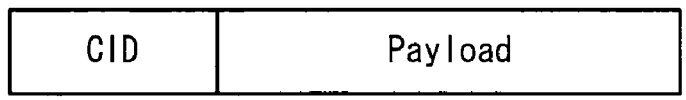
FIG. 4 is an illustrated view showing one example of a child device packet transmitted from the child device.

Subsequently, descriptions will be given as to data packet formats for wireless communications between the parent device and the child devices. A data cycle (one communication cycle) includes one parent device slot and a plurality of child device slots. In this embodiment, four child device slots are provided, for example, and the parent device thus can communicate wirelessly with up to four child devices at a time. In the parent device slot, a parent device packet as shown in FIG. 3 is broadcasted. In each of the four child device slots, a child device packet as shown in FIG. 4 is transmitted to the parent device.

As shown in FIG. 3, the parent device packet has a field sync for storing synchronizing data at its head, and has a field PID for storing a number (identifying code) PID of the parent device subsequent to the synchronizing data field sync. Following the field PID, formed are a user name field UserName and a game name field GameName. The user name field UserName registers a user name (user identifying code) read out from the ROM 52 (FIG. 1) or the ROM 42, such as "Taroh", "Ichiroh", "Jiroh", etc. in this embodiment. The game name field GameName registers a game name (game identifying code) read out from the ROM 52 or the ROM 42 in the same manner, such as F-ZERO in this embodiment. Additionally, if the user name or the game name read out from the ROM 42 is stored in the WRAM 28 and then the user name or the game name stored in the WRAM 28 is changed according to the operation of the player or the progress of the game, the changed user name or game name stored in the WRAM 28 may be read out and registered. Alternatively, it may be possible to read out and register a user name or a game name newly created and written into the WRAM 28 by the operation of the player, etc.

The parent device packet further includes a flag OC. The flag OC is a flag indicating whether or not it is possible to adapt to the above described one cartridge (OC) mode. More specifically, when this flag OC is reset, that is, when OC=0, this means that the game cartridge of the parent device at that time is not adaptable to the OC mode, or that it is adaptable to the OC mode but operates currently in the normal mode. When the flag OC is set, that is, when OC=1, this means that the game cartridge of the parent device is adaptable to the OC mode and currently operates in the OC mode.

The parent device packet includes fields ESlot, USlot, and Payload in this order subsequent to the flag OC. The E slot field Eslot stores slot numbers for the child device slots available for entry (participation). More specifically, it stores the child device slot numbers for child devices that are about to newly participate. The U slot field USlot stores a usage status of the child device slots. More specifically, the U slot field USlot includes four areas in this embodiment, for example, and each of the four areas corresponds to each of the four child device slots. Then, each of the areas stores the number (identifying code) CID for the child device that is assigned the corresponding child device slot. When the child device number OD is registered, it can be seen that the child device slot corresponding to that area is in use. Therefore, in the parent device packet data indicating that connection to the parent device is available, the E slot field is assigned a child device slot or the U slot field has an area with no child device identifying code registered.

The payload field Payload is a field for storing substantial data transmitted from the parent device to the child device. More specifically, this is a field for transmitting such data as connection response, parent device program for distribution, game process program for distribution, game data for distribution, generation information, and other required game data.

FIG. 4 shows a child device packet sent out from a child device to the child device slot assigned to the child device. The child device packet includes a head field OD for storing or registering the child device number OD, and a payload field Payload subsequent thereto. The payload field Payload is a field for storing substantial data transmitted from the child device to the parent device. More specifically, this is a field for transmitting such data as a connection request, successful reception data, other required game data, etc.

Figure 5:
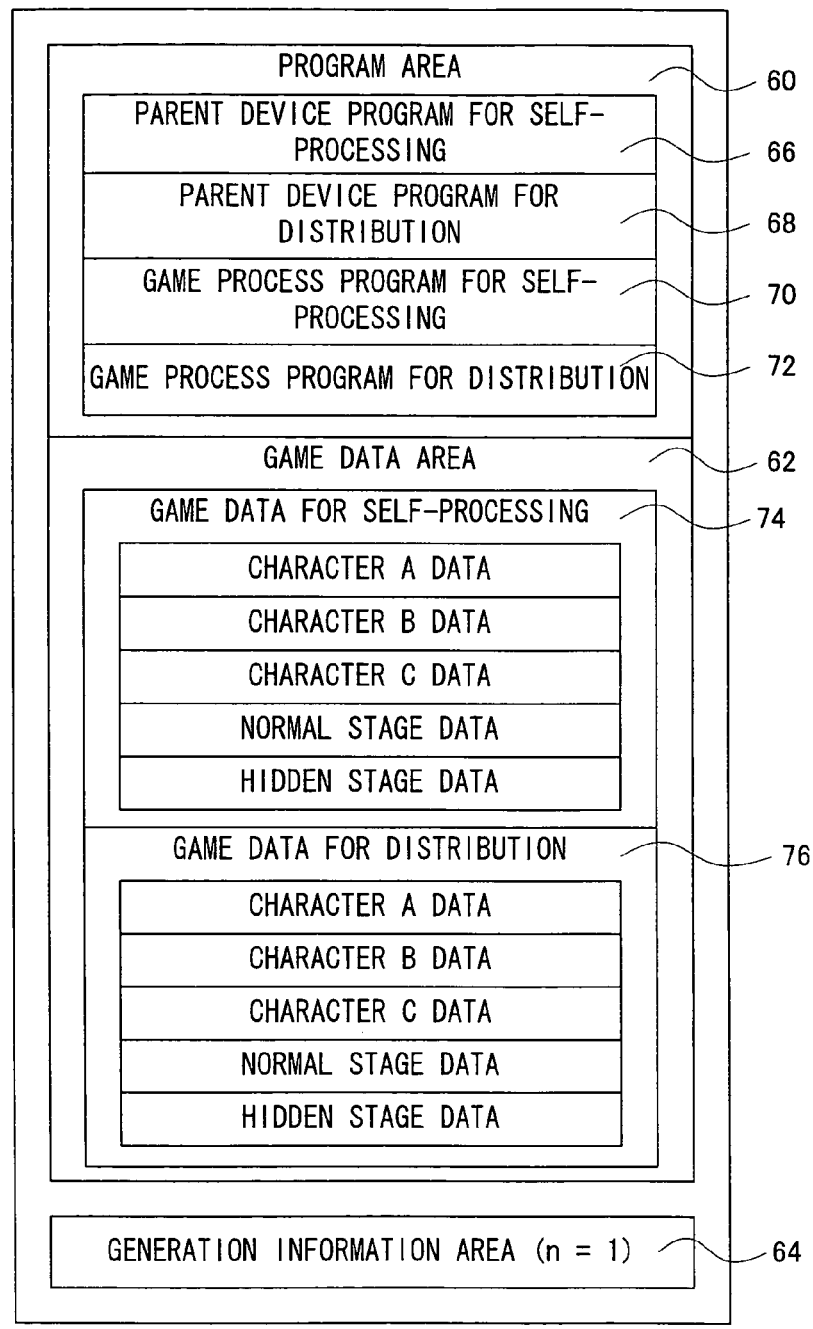
FIG. 5 is an illustrated view showing one example of a memory map for a ROM provided in a cartridge shown in FIG. 1.

FIG. 5 shows an example of a memory map for the ROM 42 of the cartridge 16 attached to the parent device. The ROM 42 includes a program area 60, a game data area 62 and a generation information area 64.

The program area 60 stores in advance the parent device program for self-processing 66, the parent device program for distribution 68, the game process program for self-processing 70, the game process program for distribution 72, etc. The parent device program for self-processing 66 is a program that can be processed in the device (parent device) itself and executed in the ROM 42, and also is a program for the parent device to connect with a plurality of child devices existing within the communicable range and transmit the program and data for distribution to the child devices. The parent device program for distribution 68 is a program distributed to the child devices and executed in the WRAM 28 of each distribution target device, and it is also a program for the child device to connect with another plurality of child devices existing within the communicable range and transmit the program and data for distribution stored in the WRAM 28 to the other plurality of child devices, acting as a tentative parent device. The game process program for self-processing 70 is a program that can be processed in the parent device and executed in the ROM 42, and it is also a program for the parent device to execute a game process using the game data for self-processing. The game process program for distribution 72 is a program distributed to the child devices and executed in the WRAM 28 of each delivery target device, and it is also a program for the child device to execute a game process in the same way, using the game data for distribution distributed to the child device.

The game data area 62 stores game data for self-processing 74, game data for distribution 76, etc., in advance. The game data for self-processing 74 is data required for execution of the game in the device (parent device) itself, and includes a plurality of kinds of character data, such as character A data, character B data and character C data, and a plurality of kinds of stage data, such as normal stage data and hidden stage data, for example. The game data for distribution 76 is data distributed to the child devices and required for execution of the game in each distribution target device, and includes a plurality of kinds of character data such as character A data, character B data and character C data, and a plurality of kinds of stage data such as normal stage data and hidden stage data, as in case with the game data for self-processing 74.

Additionally, in this embodiment, the parent device program, the game process program and the game data are each prepared in two separated forms for self-processing and for distribution. However, the two forms of data are almost the same with basically identical processing procedures, and thus it may be possible to store the common parent device program, game process program and game data in the ROM 42 in advance and distribute them to the child devices.

The generation information area 64 stores the above described generation information n in advance. The generation information n is set to "1", denoting the parent device. The generation information is transmitted to the child devices and updated in the WRAM 28 of each of the child devices, as in the case of the above stated parent device program for distribution 68, game process program for distribution 72 and game data for distribution 76. It is noted that the generation information n may be included in the parent device program for distribution 68.

Moreover, although not shown in FIG. 5, the ROM 42 stores other programs and data required for execution of the game, such as sound data for output of game music, sound effects, etc.

Figure 6:
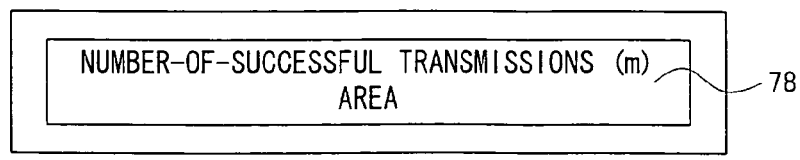
FIG. 6 is an illustrated view showing one example of a memory map for a backup RAM provided in the cartridge shown in FIG. 1.

FIG. 6 shows one example of a memory map for the backup RAM 44 of the cartridge 16. The backup RAM 44 includes a number-of-successful-transmissions area 78. The number-of-successful-transmissions area 78 saves the number of successful transmissions m. The number of successful transmissions m indicates the number of cases in which data distribution has succeeded from the parent device to the child device as described above. From the number of successful transmissions m, it is clear to how many child devices the program for distribution, etc. has been successfully transmitted from the parent device. If stored in the backup RAM 44, as in case with this embodiment, the number of successful transmissions m is retained even after the game apparatus 10 is powered off. Thus, the total number of successful transmissions m so far is calculated. On the other hand, if the number of successful transmissions m is stored in the WRAM 28 only, the number of successful transmissions is added up until the power is turned off.

Figure 7:
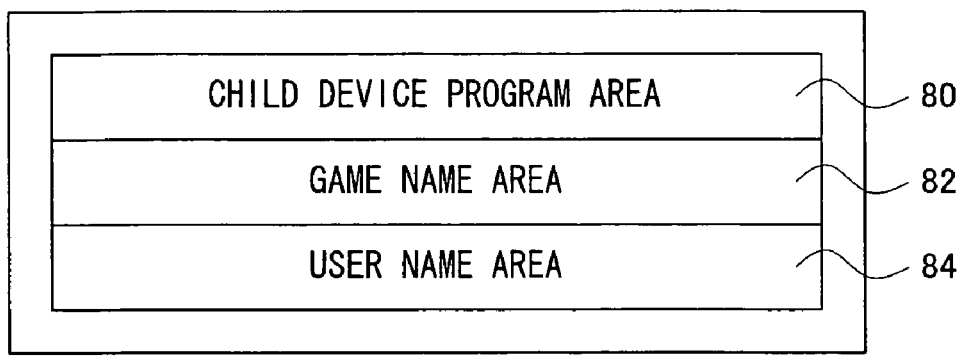
FIG. 7 is an illustrated view showing one example of a memory map for a ROM provided in a wireless communication unit shown in FIG. 1.

FIG. 7 shows one example of a memory map for the ROM 52 of the wireless communication unit 14. The ROM 52 of the wireless communication unit 14 includes a child device program area 80, a game name area 82, a user name area 84, etc. The child device program area 80 fixedly stores a child device program for the child device to communicate with the parent device. With this child device program, the child device establishes connection with the parent device, receives the program and data for distribution from the parent device, and executes the distributed program, for example. The game name area 82 stores a game name (game identifying code) in advance, such as F-ZERO in this embodiment. The user name area 84 stores a user name (user identifying code) in advance, such as Taroh in this embodiment. It is noted that the game name area 82 and the user name area 84 may be included in the child device program area 80.

Figure 8:
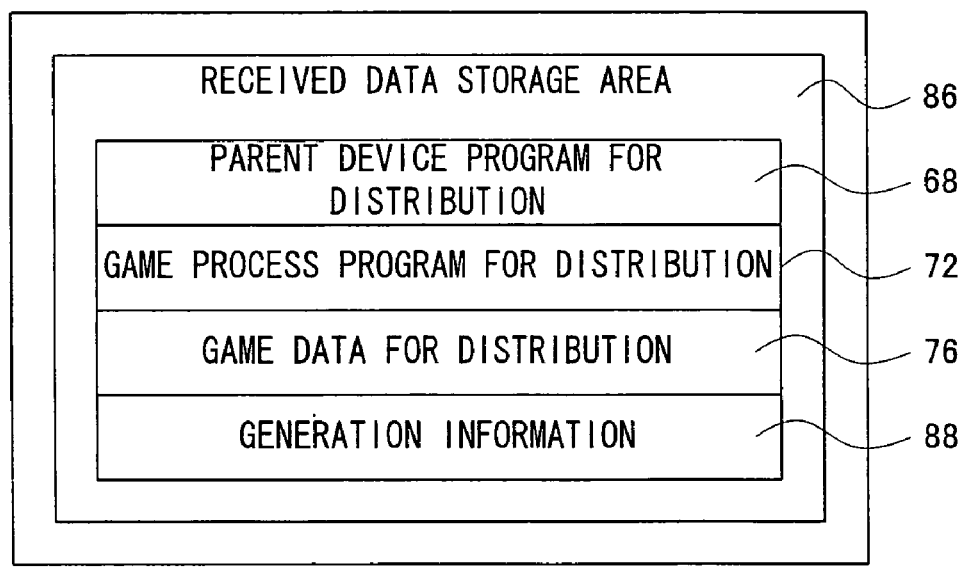
FIG. 8 is an illustrated view showing one example of a memory map for a WRAM of the child device.

FIG. 8 shows one example of a memory map for the WRAM 28 of the child device. The WRAM 28 of the child device includes a received data storage area 86. The received data storage area 86 stores the data for distribution received from the parent device or a tentative parent device. More specifically, it stores the parent device program for distribution 68, the game process program for distribution 72, the game data for distribution 76, etc. This storage area 86 is also provided with a generation information area 88 for storing the generation information n, which stores the generation information transmitted from the parent device or a tentative parent device. The generation information is updated to a next generation by the execution of the parent device program for distribution 68. In addition, the parent device program for distribution 68, the game process program for distribution 72, the game data for distribution 76 and the updated generation information in the WRAM 28 are transmitted to another plurality of child devices by the execution of the parent device program for distribution 68.

Descriptions will be given below regarding the operation of the parent device in this game system referring to FIG. 9 to FIG. 12, and the operation of the child device referring to FIG. 13 to FIG. 16.

Figure 9:
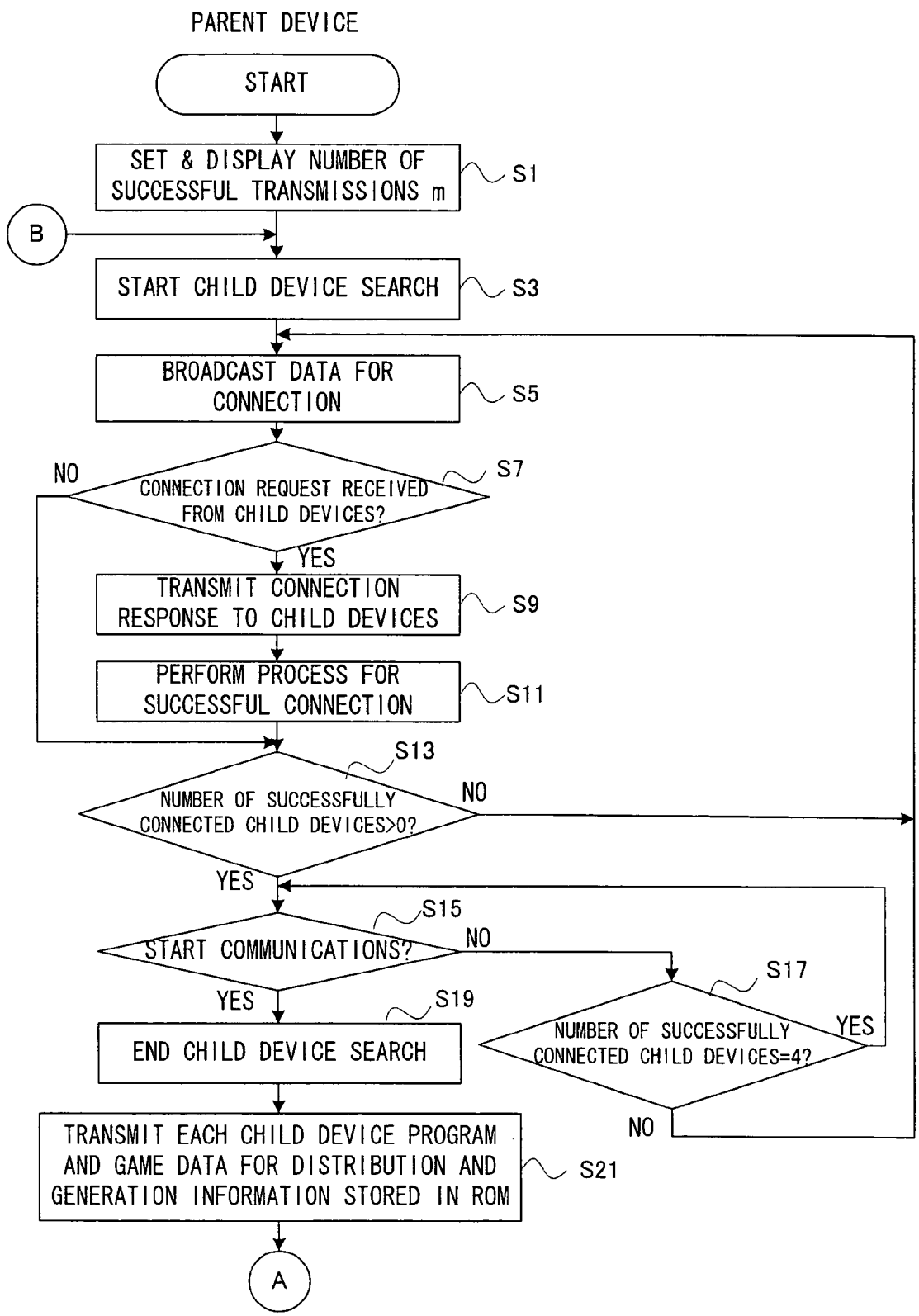
FIG. 9 is a flowchart showing one example of an operation of the parent device.
Figure 10:
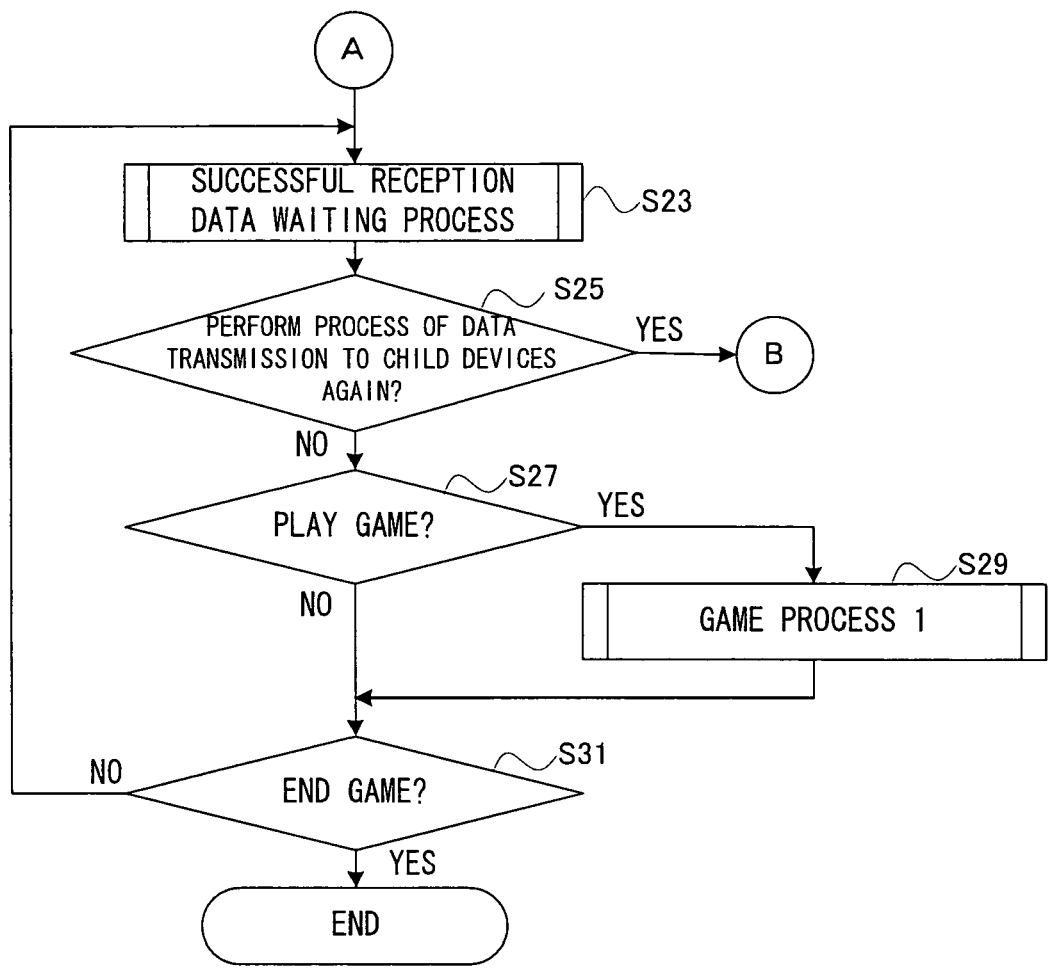
FIG. 10 is a flowchart showing the operation continued from FIG. 9.

FIG. 9 and FIG. 10 show one example of a main flow of game operation of the parent device. In a first step S1 of FIG. 9, the processor 20 (CPU core 22) of the parent device sets a variable m indicating the number of successful transmissions to a prescribed area of the WRAM 28. If stored in the number-of-transmissions area 78 of the backup RAM 44 of the cartridge 16, the number of successful transmissions is read out and set to the variable m. If it is not stored, an initial value of 0 is set. Then, the CPU core 22 writes image data indicating the value of m into an area for displaying the number of successful transmissions in the VRAM 30, and uses the LCD controller 26 to display the number of successful transmissions on the LCD 18. This allows the user or player of the parent device to recognize the number of successful transmissions m.

Next, the processor 20 starts a child device search in a step S3 to seek for child devices to which data is to be transmitted, and broadcasts the data for connection to them, using the wireless communication unit 14 in a step S5. The data for connection broadcasted here indicates the availability of connection with the parent device.

In a succeeding step S7, the processor 20 determines whether or not a connection request is received from the child devices. If "NO", the process moves directly to a step S13. On the other hand, if "YES" in the step S7, the processor 20 transmits a connection response, in a succeeding step S9, to the child devices which have transmitted a connection request. Then, in a step S11, the processor 20 performs a process for successful connection, such as storing identifying codes for the successfully connected child devices in association with the child device slots to be used, and counting the number of successfully connected child devices.

In a step S13, the processor 20 determines whether or not the number of successfully connected child devices is larger than 0. If "NO" in the step S13, that is, if no connection with any child device has yet succeeded, the process returns to the step S5 for continuation of a connection attempt.

On the other hand, if "YES" in the step S13, the processor 20 determines in a succeeding step S15 whether or not to begin communications. For example, the processor 20 displays a button, or the like, on the screen, to issue instruction to start communications, as well as the number of successfully connected child devices, and determines whether or not the A button included in the operation key 38 has been operated. In this case, it is possible to leave the start of communications (transmission of data for distribution) to the discretion of the player of the parent device. For example, the user of the parent device who wishes for a connection with four child devices, may wait without pressing the A button until four devices are available. Additionally, in this step S15, communications may be automatically started by determining whether or not the number of successfully connected child devices has reached a prescribed number, or by letting a certain amount of time elapse, for example.

If "NO" in the step S15, the processor 20 determines whether or not the number of successfully connected child devices is four, a maximum number in this embodiment. If "NO" in the step S17, the process returns to the step S5 to further attempt connection with other child devices. If "YES", the process returns to the step S15 to wait for the start of communications.

On the other hand, if "YES" in the step S15, that is, if communications are to be started, the processor 20 terminates the child device search in a step S19. Then, in a step S21, the data for distribution, stored in the ROM 42 of the cartridge 16, is transmitted to each of the successfully connected child devices. The data to be transmitted here includes the parent device program for distribution 68, the game process program for distribution 72, the game data for distribution 76, the generation information, etc. When the step S21 is completed, the process moves to a step S23 of FIG. 10.

In the next step S23 of FIG. 10, the processor 20 executes a successful reception data waiting process. Details of this process are described in FIG. 11. This process makes it possible to receive the successful reception data transmitted from each of the child devices that have received the data for distribution and update the value and display of the number-of-successful transmissions m, as described later.

In a succeeding step S25, the processor 20 determines whether or not to perform the process of data transmission to child devices again. For example, the processor 20 displays such a message as "Search for other child devices?" on the menu screen to make the player of the parent device select with the A button of the operation key 38 whether or not to execute a child device search. If "YES" in the step S25, the process returns to the step S3 of FIG. 9 to start the child device search again and attempt connection with and data transmission to another plurality of child devices.

Figure 12:
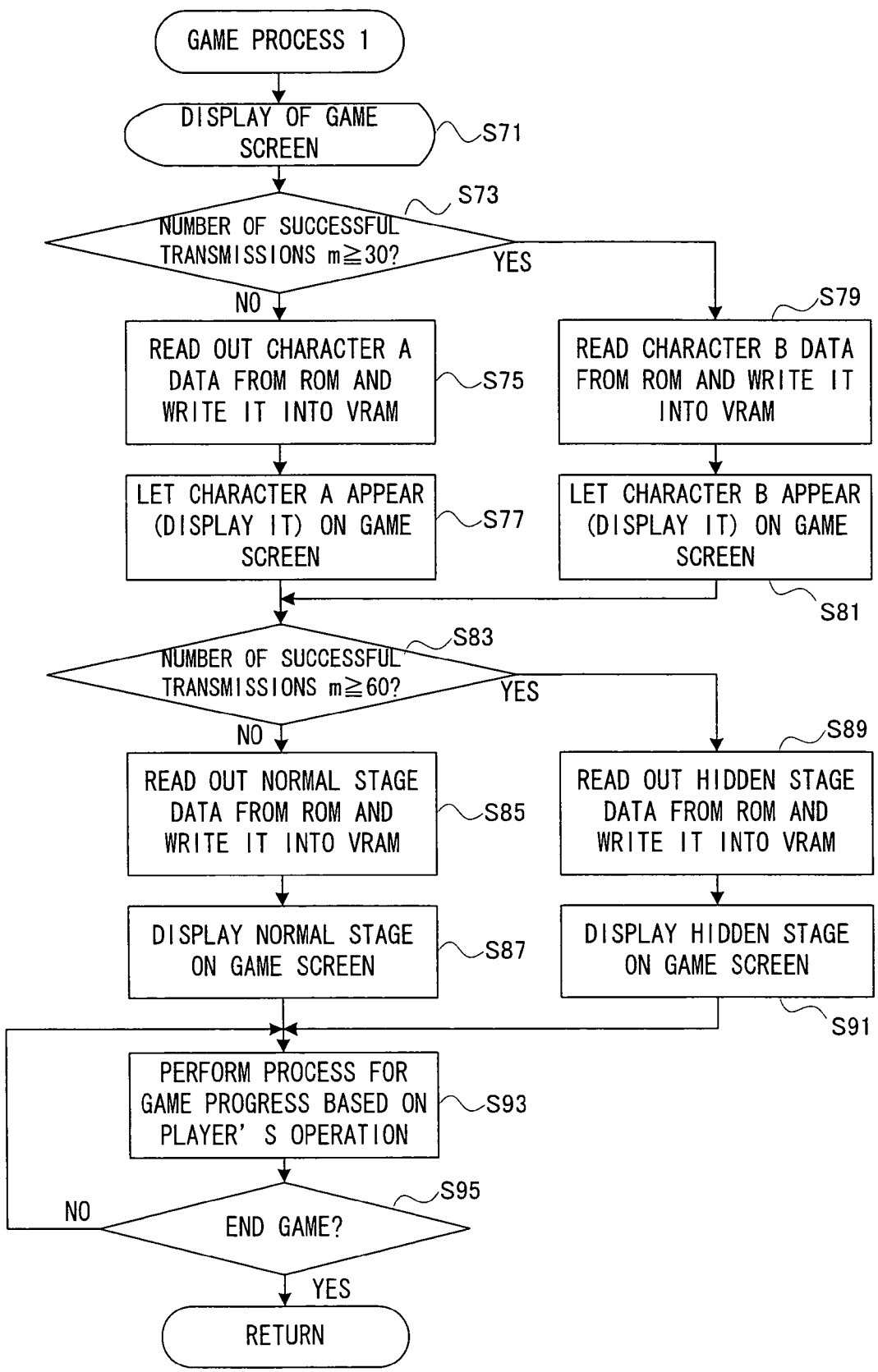
FIG. 12 is a flowchart showing one example of an operation of a game process 1 in FIG. 10.

On the other hand, if "NO" in the step S25, the processor 20 determines whether or not to play the game in a step S27. That is, the processor 20 determines whether or not the operation key 38 has been operated by the player to issue instruction to play the game. If "YES" in the step S27, the processor 20 executes a game process 1 in a step S29 according to the instruction from the player. Details of this process are shown in FIG. 12. With this process, details of the game are varied depending on the value of the number-of-successful transmissions m, as described later.

On the other hand, if "NO" in the step S27, or when the step S29 is completed, the processor 20 determines in a succeeding step S31 whether or not to end the parent device process. If "NO" in the step S31, the process returns to the step S23. If "YES", the parent device process is terminated.

Figure 11:
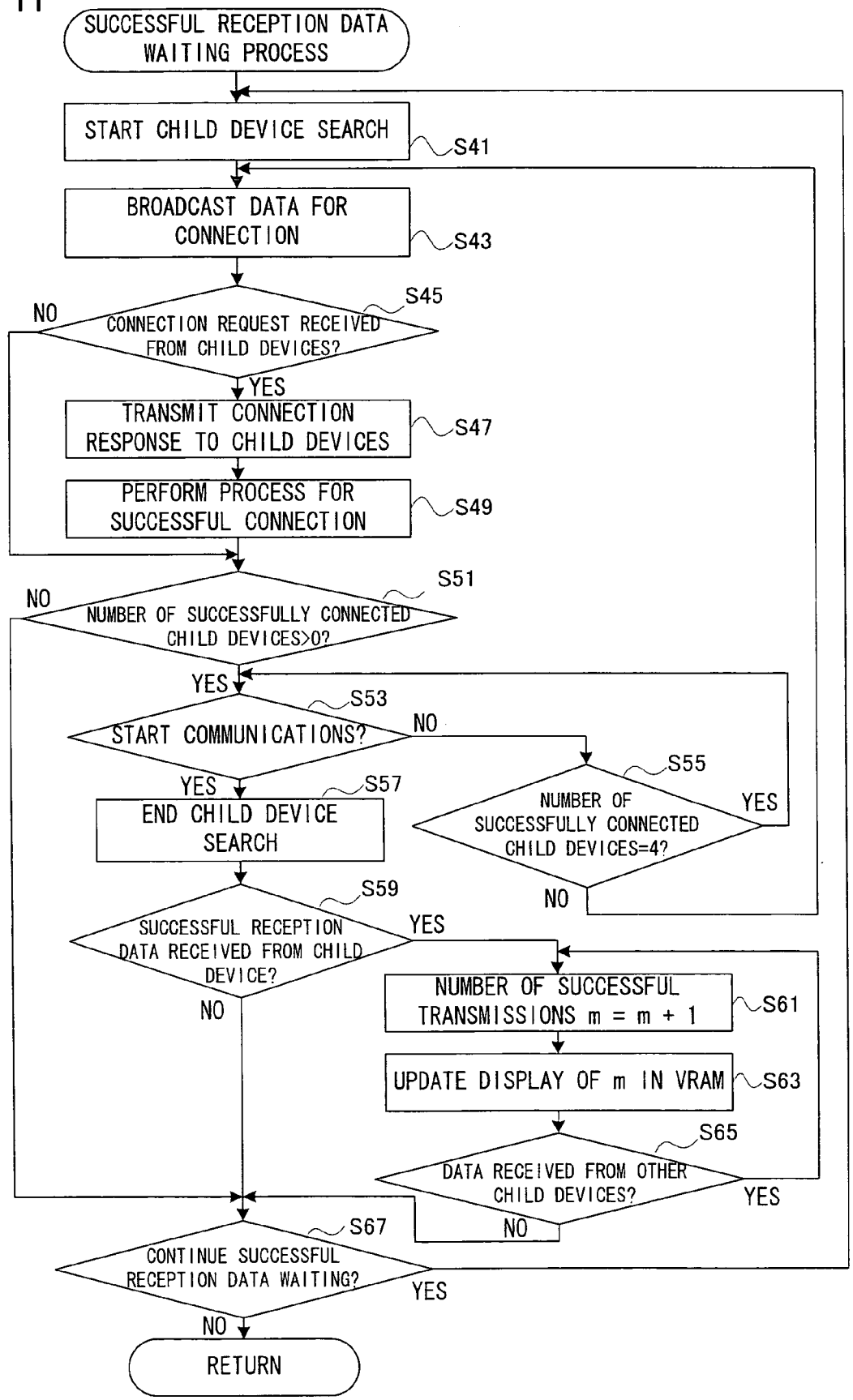
FIG. 11 is a flowchart showing one example of an operation of successful reception data waiting process in FIG. 10.

FIG. 11 shows one example of an operation in the successful reception data waiting process of the step S23 of FIG. 10. In the process of a step S41 to a step S49 of FIG. 11, a child device search is performed within the communicable range and connection with the child devices is established. Descriptions on this process are omitted here because it is the same as the process of the step S3 to the step S11 of FIG. 10 described above.

In a step S51, the processor 20 determines whether or not the number of successfully connected child devices is larger than 0. If "NO", the process moves to a step S67. If "YES", the process moves to a step S53. Descriptions on a process of a step S53 to a step S57 are omitted here because it is the same as the process of the step S15 to the step S19 of FIG. 9 described above.

In a step S59, the processor 20 determines whether or not the successful reception data is received from each child device. If "NO" in the step S59, the process moves to a step S67. On the other hand, if "YES" in the step S59, the processor 20 increments and updates the number of successful transmissions m in a step S61. In this embodiment, the updated number of successful transmissions m is written into the number-of-successful-transmissions area 78 of the backup RAM 44. Subsequently, an area for displaying the number of successful transmissions m in the VRAM 30 is updated in a step S63. This allows the updated number of successful transmissions to be displayed on the LCD 18.

Then, in a step S65, the processor determines whether or not the successful reception data is received from other child devices as well. If "YES", the process returns to the step S61 to update the value and display of the number of successful transmissions m. If "NO", the process goes to a step S67.

In the step S67, the processor 20 determines whether or not to continue waiting for the successful reception data. For example, the processor 20 determines whether or not a certain amount of time has not elapsed after the start of this waiting process, or whether or not the operation key 38 has been operated by the player to instruct whether or not to continue the waiting process, etc. If "YES" in this step S67, that is, if the waiting process is to be continued, the process returns to the step S41. If "NO", the process is ended and returns to the step S25 of FIG. 10.

FIG. 12 shows one example of an operation of the game process 1 in the step S29 of FIG. 10. In a first step S71 of FIG. 12, the processor 20 displays the game screen on the LCD 18. Next, in a step S73, the processor 20 determines whether or not the number of successful transmissions m is "30" or more, for example. If "NO" in the step S73, the processor 20 reads out the character A data from the game data for self-processing 74 in the ROM 42 of the cartridge 16 and writes it into the VRAM 30 in a step S75, and then lets the character A appear on the game screen and displays it on the LCD 18 in a step S77. When the step S77 is completed, the process moves to a step S83.

On the other hand, if "YES" in the step S73, the processor 20 reads out the character B data from the game data for self-processing 74 in the ROM 42 of the cartridge 16 and writes it into the VRAM 30 in a step S79, and then lets the character A appear on the game screen and displays it on the LCD 18 in a step S81. The character B is a bonus character to be offered because the number of successful transmissions is made larger than a prescribed value (30 in this embodiment). When the step S81 is completed, the process goes to a step S83.

In the step S83, the processor 20 determines whether or not the number of successful transmissions is "60" or more, for example. If "NO" in this step S83, the processor 20 reads out the normal stage data from the game data for self-processing 74 in the ROM 42 of the cartridge 16 and writes it into the VRAM 30 in a step S85, and then displays a normal stage on the game screen in a step S87. When the step S87 is completed, the process moves to a step S93.

On the other hand, if "YES" in the step S83, the processor 20 reads out hidden stage data from the game data for self-processing 74 in the ROM 42 of the cartridge 16 and writes it into the VRAM 30 in a step S89, and then displays a hidden stage on the game screen in a step S91. The hidden stage is also a bonus stage to be offered because the number of successful transmissions is made larger than a prescribed value (60 in this embodiment). When the step S91 is completed, the process moves to a step S93.

In the step S93, the processor 20 executes a process for the progress of the game based on the player's operation, that is, based on operation input from the operation key 38. It is noted that, in the process for the progress of the game, the game may be performed by the parent device alone, or the communication game may be performed in communication with the child devices within the communicable range. Then, in a step S95, the processor 20 determines whether or not to end the game. If "NO", the process returns to the step S93. If "YES", the game process 1 is terminated and returned to the step S31 of FIG. 10.

In this manner, the parent device decides the kinds of characters and stages to appear in accordance with the value of the number of successful transmissions m, and performs the game using these characters and stages. It is noted that "30" in the step S73 and "60" in the step S83 are just examples, and that a prescribed value (third value) for determining the number of successful transmissions m may be changed as necessary.

Figure 13:
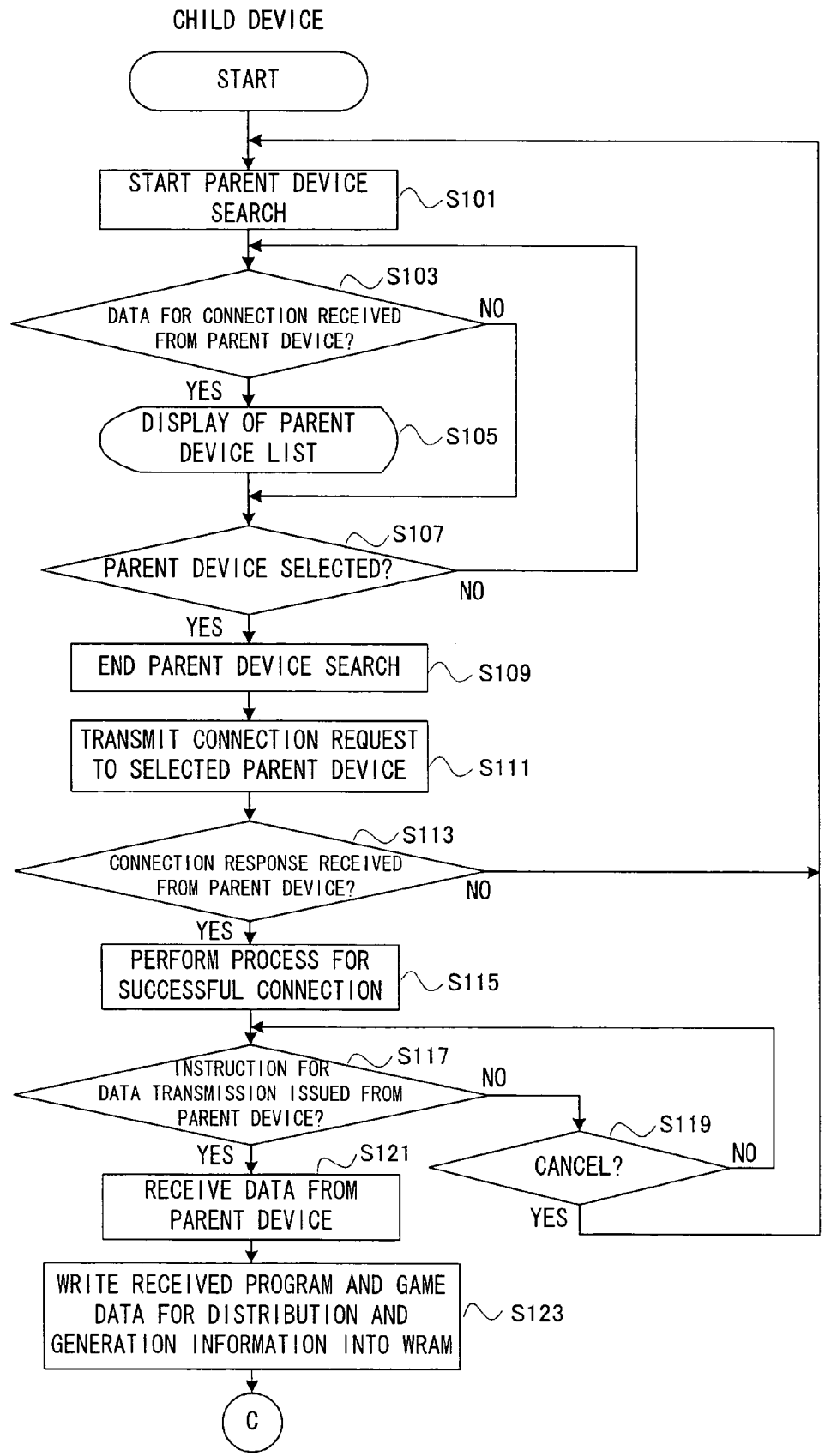
FIG. 13 is a flowchart showing one example of an operation of the child device.
Figure 14:
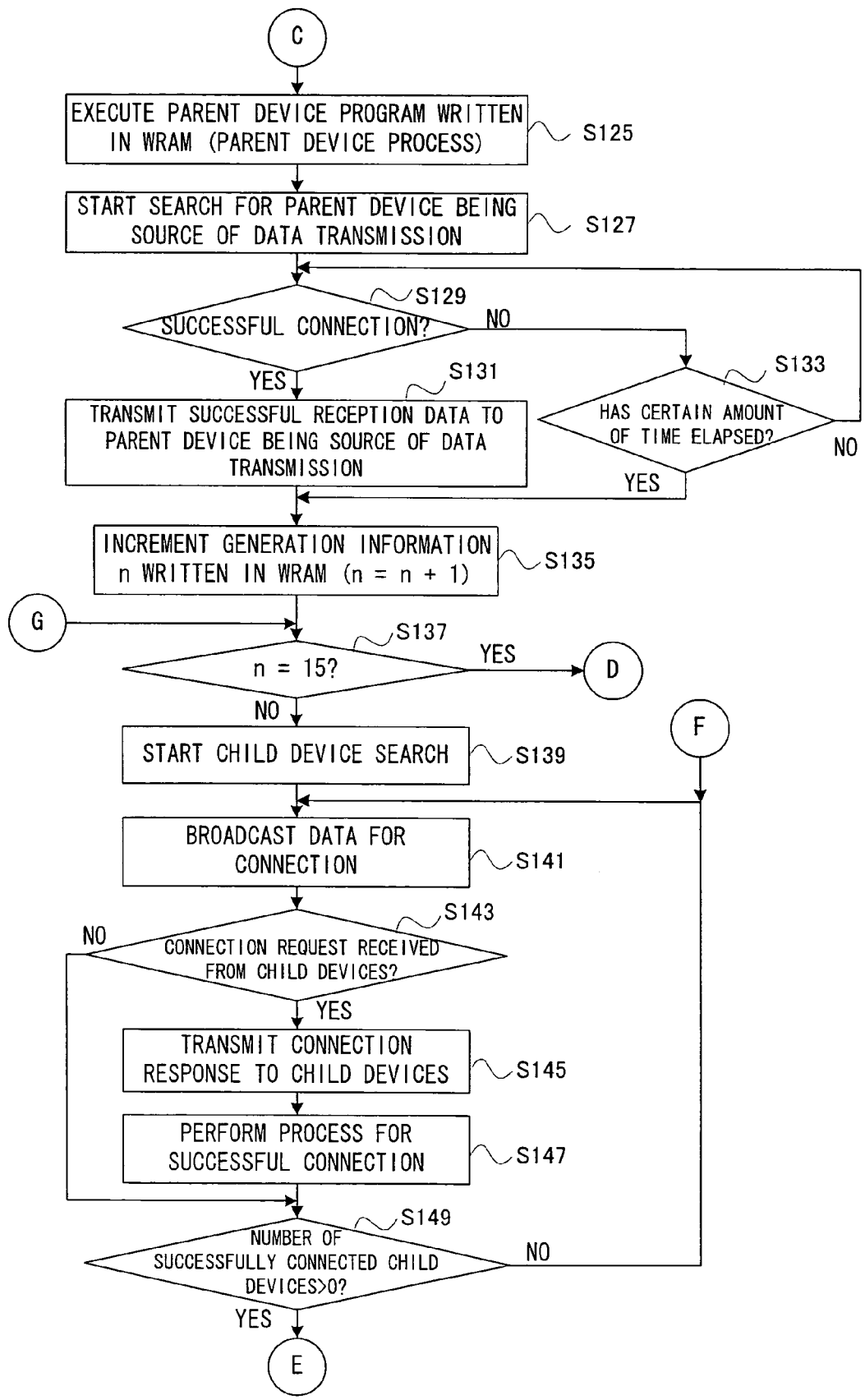
FIG. 14 is a flowchart showing one part of the operation continued from FIG. 13.
Figure 15:
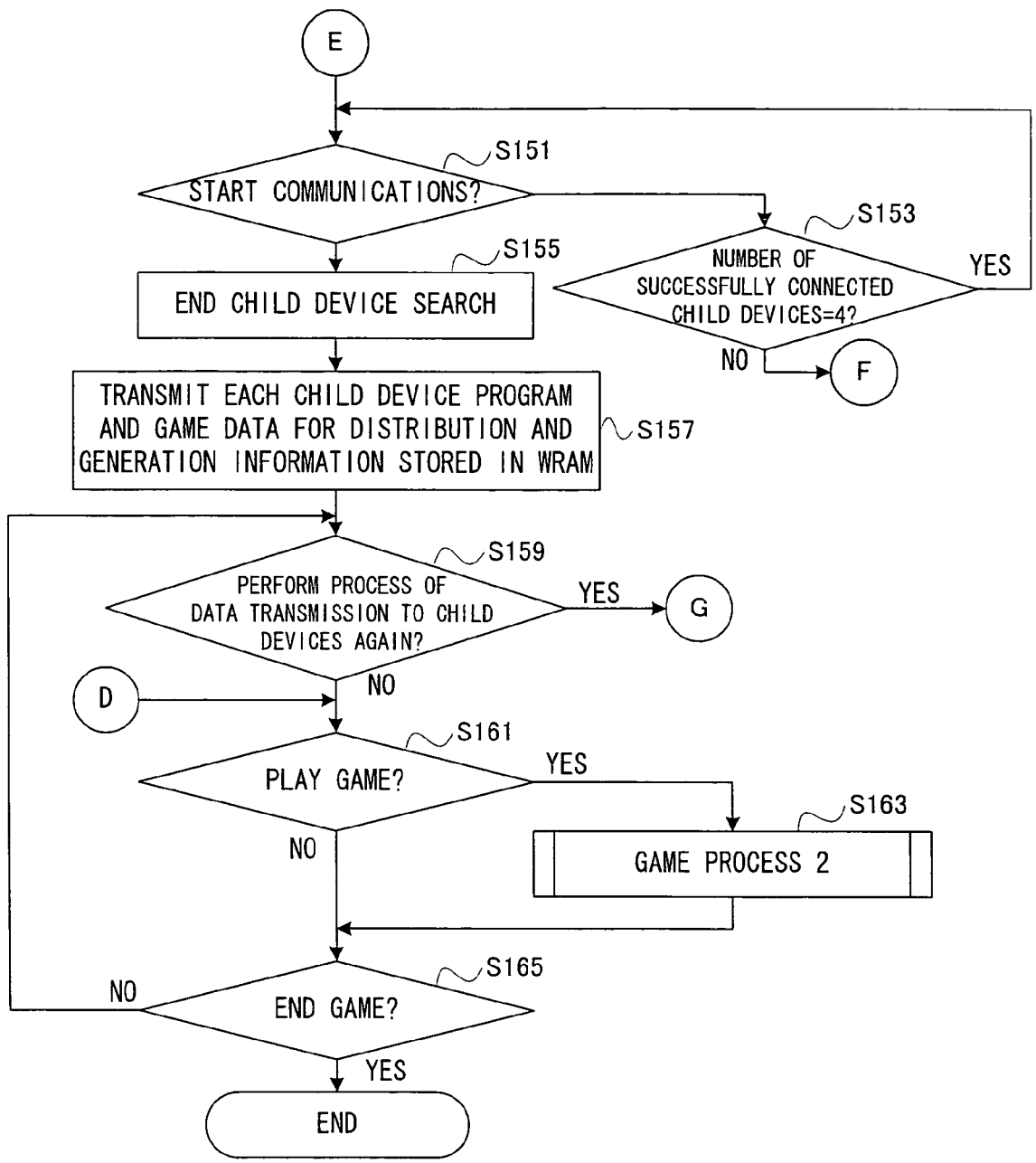
FIG. 15 is a flowchart showing the operation continued from FIG. 14.

FIG. 13 to FIG. 15 shows one example of a main flow of game operation of the child device. In a first step S101 of FIG. 13, the processor 20 (CPU core 22) of the child device starts a parent device search using the wireless communication unit 14 to receive data from the parent device (including a tentative parent device) within the communicable range, and then determines whether or not the data for connection is received from the parent device in a step S103. If "YES" in the step S103, the processor 20 displays a parent device list on the LCD 18 in a step S105. On the other hand, if "NO" in the step S103, the process moves directly to a step S107.

FIG. 17 here shows one example of the parent device list. The parent device list is a screen presenting a list of parent devices within the communicable range as shown in FIG. 17, which displays such information as a user name, generation information, a game name, etc. for each parent device. In the example of FIG. 17, the parent device with the user name "Ichiroh" has the generation information of "1", and thus it is found to be the parent device that is a source of data distribution. The parent devices with the user names "Taroh" and "Jiroh" are found to be tentative parent devices because the values of their generation information are not "1". The player of the child device can select a parent device he wishes to connect by pointing the cursor to the number indicating the parent device with the cross key included in the operation key 38 and operating the A button.

Returning to FIG. 13, in a step S107, the processor 20 determines whether or not the parent device is selected on the parent device list screen. If "NO" in the step S107, the process returns to the step S103. If "YES", the parent device search is ended in a step S109.

In a succeeding step S111, the processor 20 transmits a connection request to the selected parent device, and then determines whether or not a connection response is received from the parent device in a step S113. If "NO" in the step S113, the process returns to the step S101 to start the parent device search again. On the other hand, if "YES" in the step S113, the processor 20 performs a process for successful connection in a step S115 to store the identifying code for the successfully connected parent device and the child slot to be used, for example.

Subsequently, in a step S117, the processor 20 determines whether or not instruction for data transmission is issued from the parent device. If "NO", the processor 20 determines in a step S119 whether or not transmission is canceled, that is, whether or not the B button of the operation key 38 has been operated. If "YES" in the step S119, the process returns to the step S101 to start the parent device search again. On the other hand, if "NO" in the step S119, the process returns to the step S117.

Meanwhile, if "YES" in the step S117, the processor 20 receives the data transmitted from the parent device in a step S121, and writes the received data for distribution into the received data storage area 86 of the WRAM 28 in a step S123 (FIG. 8). This received data includes the parent device program for distribution 68, the game process program for distribution 72, the game data for distribution 76, the generation information, etc. When the step S123 is completed, the process moves to a step S125 of FIG. 14.

In the next step S125 of FIG. 14, the processor 20 executes the parent device program 68 written in the WRAM 28. That is, the processor 20 performs the parent device process to attempt data distribution as a tentative parent device. Subsequently, in a step S127, the processor 20 starts a search for the parent device that is the source of data transmission. The parent device that is the source of data transmission is the parent device that originally delivered the data received by this child device and that has the generation information of "1". The identifying code for the parent device that is the source of data transmission is transmitted together with the data for distribution from the parent device itself or a tentative parent device. By the step S127, in a case where the data for connection is received from the parent device, for example, transmission of a connection request and reception of a connection response are attempted.

Subsequently, in a step S129, the processor 20 determines whether or not connection with the parent device that is the source of data transmission, has succeeded, for example. More specifically, the processor 20 determines whether or not the connection response transmitted from the parent device in the step S47 of FIG. 11, is received. If "YES" in a step S129, the processor 20 ends the parent device search, and then transmits the successful reception data, indicating that the data for distribution is successfully received, to the parent device that is the source of data transmission, in a step S131.

On the other hand, if "NO" in the step S129, the processor 20 determines whether or not a certain amount of time has elapsed after the start of the parent device search, for example, in a step S133. If "NO" in the step S133, the process returns to the step S129. If "YES", the processor 20 terminates the parent device search and moves directly to a step S135 without transmitting the successful reception data.

Then, in a step S135, the processor 20 increments the generation information n written in the WRAM 28 to update the generation information of this child device.

Subsequently, in a step S137, the processor 20 determines whether or not the updated generation information n is equal to a prescribed value ("15" in this embodiment). This prescribed value (second value) is set as a threshold value for deactivating the process of transmitting the data for distribution. If "YES" in this step S137, that is, if the updated generation information has the second value, the processor 20 advances the process to a step S161 of FIG. 15, deactivating and not executing the data transmission process as a tentative parent device.

On the other hand, if "NO" in the step S137, that is, if a condition for limitation of data distribution is not fulfilled, the processor 20 starts a child device search in a step S139 to seek for another plurality of child devices to which data is to be distributed. Descriptions on a process of the step S139 to a step S149 of FIG. 14 and a process of a step S151 to a step S155 are here omitted because they are same as the above described process of the step S9 to the step S19 of FIG. 9.

In a step S157 of FIG. 15, the processor 20 transmits, to each of the successfully connected child devices, the data for distribution stored in the WRAM 28, that is, the parent device program for distribution 68, the game process program for distribution 72, the game data for distribution 76, and the updated generation information 88.

Subsequently, in a step S159, the processor 20 determines whether or not to perform the process of data transmission to the child devices again. Here, as in case with the step S25 of FIG. 10, the processor 20 makes the user of the child device to select with the A button of the operation key 38 whether or not to transmit the data to other child devices, for example. If "YES" in the step S159, the process returns to the step S137 of FIG. 14.

Figure 16:
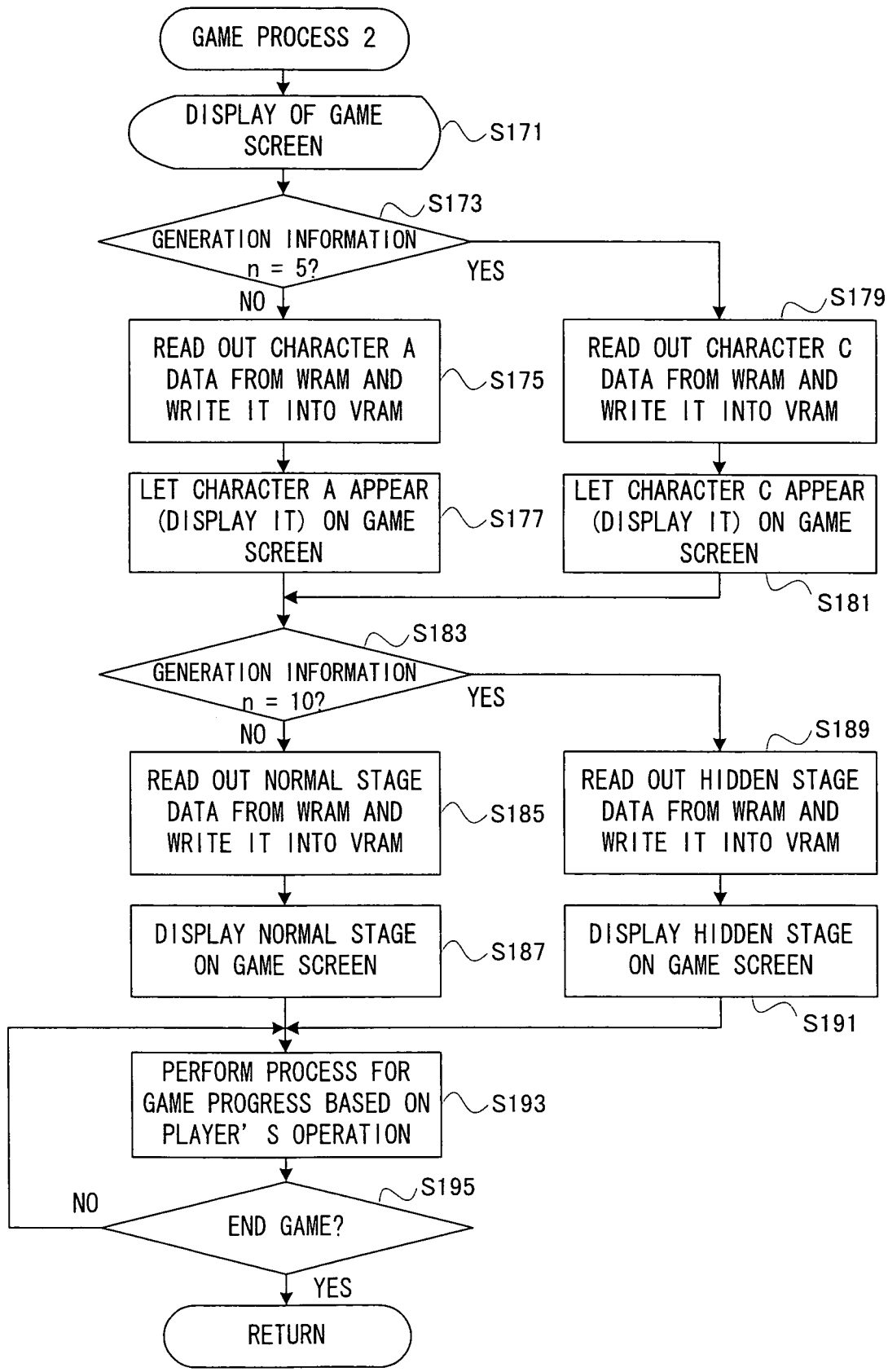
FIG. 16 is a flowchart showing one example of an operation of a game process 2 in FIG. 15.

On the other hand, if "NO" in the step S159, the processor 20 determines in a step S161 whether or not to play the game. More specifically, the processor 20 determines whether or not there is the operation of the operation key 38 from the player to instruct for game playing, for example. If "YES" in the step S161, the processor 20 execute a game process 2 in a step S163. Details of this process are shown in FIG. 16. By this process, details of the game are varied depending on the value of the generation information n, as described later.

On the other hand, if "NO" in the step S161, or when the step S163 is completed, the processor 20 determines in a succeeding step S165 whether or not to end the child device process. If "NO" in the step S165, the process returns to the step S159. If "YES", the child device process is terminated.

FIG. 16 shows one example of an operation of the game process 2 in the step S163 of FIG. 15. In a first step S171 of FIG. 16, the processor 20 displays the game screen on the LCD 18. Next, in a step S173, the processor 20 determines whether or not the generation information n is "5", for example. If "NO" in the step S173, the processor 20 reads out the character A data from the game data for distribution 76 in the WRAM 28 and writes it into the VRAM 30 in a step S175, and then lets the character A appear on the game screen and display it on the LCD 18 in a step S177. When the step S177 is completed, the process goes to a step S183.

On the other hand, if "YES" in the step S173, the processor 20 reads out the character C data from the game data for distribution 76 in the WRAM 28 and writes it into the VRAM 30 in a step S179, and then lets the character C appear on the game screen and display it on the LCD 18 in a step S181. The character C is a bonus character to be offered to the child device whose generation information has a prescribed value. When the step S181 is completed, the process moves to a step S183.

In the step S183, the processor 20 determines whether or not the generation information n is "10", for example. If "NO" in the step S183, the processor 20 reads out the normal stage data from the game data for distribution 76 in the WRAM 28 and writes it into the VRAM 30 in a step S185, and then displays the normal stage on the game screen in a step S187. When the step S187 is completed, the process moves to a step S193.

On the other hand, if "YES" in the step S183, the processor 20 reads out the hidden stage data from the game data for distribution 76 in the WRAM 28 and writes it into the VRAM 30 in a step S189, and then displays the hidden stage on the game screen in a step S191. The hidden stage is a bonus stage to be offered to the child device whose generation information has a prescribed value. When the step S191 is completed, the process moves to a step S193.

In the step S193, the processor 20 performs the process for the progress of the game based on the player's operation, that is, based on operation input from the operation key 38. It is noted that, in the process for the progress of the game, the game may be performed by the child device alone, or the communication game may be performed in communications between the parent device and the child devices within the communicable range. Then, in a step S195, the processor 20 determines whether or not to end the game. If "NO", the process returns to the step S193. If "YES", the game process 2 is ended and returns to the step S165 of FIG. 15.

In this manner, the child device decides the kinds of characters and stages to appear in accordance with the value of generation information n, and performs the game using these characters and stages. It is noted that "5" in the step S173 and "10" in the step S183 are just examples, and that a prescribed value (first value) for determining the generation information n may be changed as necessary.

Additionally, although the successful reception data is transmitted directly to the parent device that is the transmission source (n=1) in each of the above described embodiments, it may be possible instead to transmit the successful reception data to the tentative parent devices that have transmitted the received data, tracing back to them in sequence, so that the successful reception data is finally transmitted to the parent device being a transmission source (n=1). By doing this, the successful reception data can be reliably transmitted in a case where the tentative parent devices remain within the communicable range. This makes it possible to increase the success rate of transmission of successful reception data as compared to a case where the data is transmitted directly from each child device to the parent device being a transmission source (n=1).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wireless communication game system including at least one parent device and a plurality of child devices that can communicate wirelessly with one another, wherein
said parent device comprises:
first data storage locations which store at least a parent device program and game data;
first communication programmed logic circuitry which communicates wirelessly with a plurality of child devices; and first connection programmed logic circuitry which searches for a plurality of communicable child devices and establishes a connection with each of the child devices by broadcasting data for connection with use of said first communication programmed logic circuitry;

each of said child devices comprises:

second communication programmed logic circuitry for communicating wirelessly with said parent device; and second connection programmed logic circuitry for searching for said communicable parent device and establishing a connection with said parent device by receiving said data for connection with use of said second communication programmed logic circuitry; and said parent device further comprises a transmitter for transmitting, with the use of said first communication programmed logic circuitry, said parent device program and said game data stored in said first data storage locations to each of the child devices with which connection is established by said first connection programmed logic circuitry and said second connection programmed logic circuitry; and each of said child devices further comprises:

a receiver for receiving, with the use of said second communication programmed logic circuitry, said parent device program and said game data from said parent device with which a connection is established by said first connection programmed logic circuitry and said second connection programmed logic circuitry;

second data storage locations which store said parent device program and said game data received by said receiver in a writable and readable manner; and parent device processing programmed logic circuitry for executing said parent device program stored in said second data storage locations, and wherein said parent device processing programmed logic circuitry executes said parent device program to search for another plurality of communicable child devices and establish connection with each of the child devices by broadcasting the data for connection with the use of said second communication programmed logic circuitry, and transmitting, with the use of the second communication programmed logic circuitry, said parent device program and said game data stored in said second data storage locations to each of the child devices with which a connection is established.

2. A wireless communication game system according to claim 1, wherein said first data storage locations further store generation information indicating what generation said parent device program and said game data belong in relation to the original data stored in said parent device;

said transmitter transmits said generation information in addition to said parent device program and said game data;

said receiver receives said generation information in addition to said parent device program and said game data;

said second data storage locations store said generation information received by said receiver; and said parent device processing programmed logic circuitry updates said generation information stored in said second data storage locations, and transmits to each of said child devices the updated generation information in addition to said parent device program and said game data.

3. A wireless communication game system according to claim 2, wherein each of said child devices further comprises second game processing programmed logic circuitry for processing said game data stored in said second data storage location according to instructions from a player; and said second game processing programmed logic circuitry changes a game process when said updated generation information corresponds to a first predetermined value.

4. A wireless communication game system according to claim 2, wherein said parent device processing programmed logic circuitry deactivates a process of transmitting said parent device program and said game data when said updated generation information corresponds to a second predetermined value.

5. A wireless communication game system according to claim 1, wherein said parent device processing programmed logic circuitry transmits successful reception data to said parent device, in response to reception of said parent device program and said game data by said receiver; and said parent device further comprises:

a number-of-successful-transmissions storage location for storing a number-of-successful-transmissions value in an updatable manner, based on said successful reception data received from each child device via said first communication programmed logic circuitry; and a display for displaying the number of successful transmissions stored in said number-of-successful-transmissions storage location.

6. A wireless communication game system according to claim 5, wherein said parent device further comprises:

determination programmed logic circuitry which determines whether or not the number of successful transmissions stored in said number-of-successful-transmissions storage location is a third predetermined value; and first game processing programmed logic circuitry for processing said game data stored in said first data storage location according to instructions from the player; and said first game processing programmed logic circuitry changes a game process depending on whether or not said determination programmed logic circuitry determines that said number of successful transmissions is the third predetermined value.

7. A wireless communication game system including at least one parent device and a plurality of child devices that can communicate wirelessly with one another, wherein said parent device comprises:

first data storage locations for storing at least a parent device program, game data, and generation information indicating what generation said parent device program and said game data belong to in relation to the original data stored in said parent device;

first communication programmed logic circuitry which communicates wirelessly with a plurality of child devices; and a transmitter for transmitting to each of the child devices said parent device program, said game data and said generation information stored in said first data storage location, with use of said first communication programmed logic circuitry; and each of said child devices comprises:
second communication programmed logic circuitry for communicating wirelessly with said parent device;
a receiver for receiving said parent device program, said game data and said generation information from said parent device with use of the second communication programmed logic circuitry;
second data storage locations for storing, in a writable and readable manner, said parent device program, said game data and said generation information received by said receiver; and
parent device processing programmed logic circuitry for executing said parent device program stored in said second data storage location; and wherein
said parent device processing programmed logic circuitry executes said parent device program to update said generation information stored in said second data storage location and transmits to another plurality of child devices said parent device program, said game data and said updated generation information stored in said second data storage locations, with the use of said second communication programmed logic circuitry.

8. The wireless communication game system of claim 1, wherein each said child device is configured to receive and execute the parent device program from the parent device in order for the respective child devices to function as a parent device configured to transmit at least the parent device program to other child devices.

9. The wireless communication game system of claim 7, wherein each said child device is configured to receive and execute the parent device program from the parent device in order for the respective child devices to function as a parent device configured to transmit at least the parent device program to other child devices.

10. A non-transitory storage medium storing a wireless communication game program for a wireless communication game system including at least one parent device and a plurality of child devices that can communicate wirelessly with one another, wherein
said parent device comprises:
first data storage locations for storing at least a parent device program and game data; and
first communication programmed logic circuitry for communicating wirelessly with a plurality of child devices; and
each of said child devices comprises:
second communication programmed logic circuitry for wirelessly communicating with said parent device; and
second data storage locations for storing data, received with use of said second communication programmed logic circuitry, in a writable and readable manner, and wherein
said wireless communication game program causes a processor of said parent device to search for a plurality of communicable child devices and establish a connection with each of the child devices by broadcasting data for connection with use of said first communication programmed logic circuitry;
said wireless communication game program causes a processor of said child device to search for said communicable parent device and establish a connection with said parent device by receiving said data for connection with the use of said second communication programmed logic circuitry;
said wireless communication game program causes the processor of said parent device to transmit said parent device program and said game data stored in said first data storage locations to each of the child devices with which connection is established with said first and second communication programmed logic circuitry; and
said wireless communication game program causes the processor of said child device to:
receive said parent device program and said game data from said parent device with which connection is established with said first and second communication programmed logic circuitry and store the same in said second data storage locations; and
execute said parent device program stored in said second data storage locations; and wherein
said parent device program is executed to search for another plurality of communicable child devices and establish connection with each of the child devices by broadcasting the data for connection with the use of said second communication programmed logic circuitry, and transmit said parent device program and said game data stored in said second data storage locations to each of the child devices with which connection is established.

11. A non-transitory storage medium storing a wireless communication game program according to claim 10, wherein
said first data storage locations further stores generation information indicating what generation said parent device program and said game data belong to in relation to the original data stored in said parent device;
said transmitting transmits said generation information in addition to said parent device program and said game data;
said receiving receives said generation information, in addition to said parent device program and said game data, and stores the same in said second data storage locations; and
said parent device execution updates said generation information stored in said second data storage locations, and transmits to each of said child devices said updated generation information in addition to said parent device program and said game data.

12. A non-transitory storage medium storing a wireless communication game program according to claim 11, wherein
said wireless communication game program causes the processor of said child device to process said game data stored in said second data storage locations according to instructions from a player; and
said processing changes a game process when said updated generation information corresponds to a first predetermined value.

13. A non-transitory storage medium storing a wireless communication game program according to claim 11, wherein
a process of transmitting said parent device program and said game data is deactivated when said updated generation information corresponds to a second predetermined value.

14. A non-transitory storage medium storing a wireless communication game program according to claim 10, wherein
said parent device execution transmits successful reception data to said parent device, in response to reception of said parent device program and said game data by said receiving; and said wireless communication game program causes the processor of said parent device to further:
store a number of successful transmissions in an updatable manner, based on said successful reception data received from each child device via said first communication programmed logic circuitry; and
display the stored number of successful transmissions.

15. A non-transitory storage medium storing a wireless communication game program according to claim 14, wherein
said wireless communication game program causes the processor of said parent device to further:
process said game data stored in said first data storage locations according to instructions from the player; and
change a game process depending on whether or not said number of successful transmissions corresponds to a third predetermined value.

16. A non-transitory storage medium storing a wireless communication game program according to claim 12, wherein
a process of transmitting said parent device program and said game data is deactivated when said generation information corresponds to a second predetermined value.

17. The non-transitory storage medium of claim 10, wherein each said child device is configured to receive and execute the parent device program from the parent device in order for the respective child devices to function as a parent device configured to transmit at least the parent device program to other child devices.

18. A non-transitory storage medium storing a wireless communication game program for a wireless communication game system including at least one parent device and a plurality of child devices that can communicate wirelessly with one another, wherein
said parent device comprises:
first data storage locations for storing at least a parent device program, game data, and generation information indicating what generation said parent device program and said game data belong to when counting from the ones in said parent device; and
first communication programmed logic circuitry for communicating wirelessly with a plurality of child devices; and
each of said child devices comprises:
second communication programmed logic circuitry for communicating wirelessly with said parent device; and
second data storage locations for storing in a writable and readable manner said data received with use of said second communication programmed logic circuitry, and wherein
said wireless communication game program causes a processor of said parent device to transmit to each of the child devices said parent device program, said game data and said generation information stored in said first data storage locations, with use of said first communication programmed logic circuitry;
said wireless communication game program causes a processor of said child device to:
receive said parent device program, said game data and said generation information from said parent device with use of said second communication programmed logic circuitry and store the same in said second data storage locations; and
execute said parent device program stored in said second data storage location; and wherein
said execution causes said parent device program to update said generation information stored in said second data storage locations, and transmit to another plurality of child devices said parent device program, said game data and said updated generation information stored in said second data storage locations, with the use of said second communication programmed logic circuitry.

19. The non-transitory storage medium of claim 18, wherein each said child device is configured to receive and execute the parent device program from the parent device in order for the respective child devices to function as a parent device configured to transmit at least the parent device program to other child devices.

20. A device configured to wirelessly communicate with a plurality of game devices in a wireless game system, comprising:
a receiver configured to receive a parent device program and game data from a second device in the plurality of game devices, the device and the second device being in wireless communication with each other, the second device being a parent device of the device;
a processor configured to execute the parent device program on the device and cause the device to act as a parent device;
a transmitter configured to transmit the parent device program and the game data from the device to a third device in the plurality of game devices when the device is acting as a parent device, the device and the third device being in wireless communication with each other, the device being a parent device of the third device,
wherein the first, second, and third devices are different devices in the plurality of game devices.

21. The device of claim 20, wherein the device is configured to receive and execute the parent device program in order for the device to function as a second device configured to transmit at least the parent device program to the third device.

22. A device configured to wirelessly communicate with a plurality of game devices in a wireless game system, comprising:
a receiver configured to receive a parent device program, game data, and corresponding generation information from a second device in the plurality of game devices, the device and the second device being in wireless communication with each other, the second device being a parent device of the device;
a processor configured to execute the parent device program on the device, update generation information on the device, and cause the device to act as a parent device;
a transmitter configured to transmit the parent device program, the updated generation information, and the game data from the device to a third device in the plurality of game devices when the device is acting as a parent device, the device and the third device being in wireless communication with each other, the device being a parent device of the third device,
wherein the first, second, and third devices are different devices in the plurality of game devices.

23. The device of claim 22, wherein the device is configured to receive and execute the parent device program in order for the device to function as a second device configured to transmit at least the parent device program to the third device.

* * * * *